US012743951B2

(12) United States Patent
Choung et al.

(10) Patent No.: US 12,743,951 B2
(45) Date of Patent: Sep. 22, 2026

(54) METHOD FOR REPLACING ABNORMAL TRAFFIC DATA

(71) Applicant: NOTA, INC., Daejeon (KR)

(72) Inventors: Seungyeon Choung, Daejeon (KR); Haejin Lee, Daejeon (KR); Wonjin Woo, Daejeon (KR)

(73) Assignee: NOTA, INC., Daejeon (KR)

( * ) Notice: Subject to any disclaimer, the term of this patent is extended or adjusted under 35 U.S.C. 154(b) by 188 days.

(21) Appl. No.: 18/925,806

(22) Filed: Oct. 24, 2024

(65) Prior Publication Data

US 2026/0037623 A1 Feb. 5, 2026

(30) Foreign Application Priority Data

Jul. 31, 2024 (KR) ........................ 10-2024-0101866
Jul. 31, 2024 (KR) ........................ 10-2024-0101867

(51) Int. Cl.
*G08G 1/00* (2006.01)

(52) U.S. Cl.
CPC ...................................... *G08G 1/00* (2013.01)

(58) Field of Classification Search
CPC ........................................................ G08G 1/00
See application file for complete search history.

(56) References Cited

U.S. PATENT DOCUMENTS 11,143,156 B2 * 10/2021 Chae .................. F02N 11/0837
12,327,472 B2 * 6/2025 Kim ........................ G08G 1/01
12,499,757 B2 * 12/2025 Al-Hatef ................ G06V 10/82
2012/0054145 A1 * 3/2012 Suzuki ..................... G06N 5/04 706/52
2015/0127245 A1 * 5/2015 Jang ..................... G08G 1/0116 701/117
2018/0211523 A1 * 7/2018 Ashida ................. G08G 1/0141
2018/0359172 A1 * 12/2018 Yadav ..................... G06N 20/00
2019/0043348 A1 * 2/2019 Eno .................. G08G 1/096827
2019/0360446 A1 * 11/2019 Chae ................... F02N 11/0837
2020/0180647 A1 * 6/2020 Anthony ............... B60W 40/04
(Continued)

FOREIGN PATENT DOCUMENTS

KR 10-2020-0040501 A 4/2020
KR 102124955 B1 6/2020
(Continued)

*Primary Examiner* — Tyler J Lee

(74) *Attorney, Agent, or Firm* — Seed Intellectual Property Law Group LLP

(57) ABSTRACT

A method for providing a user interface to replace abnormal traffic data on a computing device is disclosed. The method involves displaying target traffic data for a site where a replacement task will occur. Upon user input specifying a replacement period, the interface shows performance data for AI models mapped to the site and candidate inference results generated by these models. The user selects a target inference result or AI model, and the interface displays the replacement result. The interface includes a verification screen with a chart highlighting the replacement period and a list detailing performance data and replacement results for sub-periods. Each sub-period replacement is linked to corresponding AI model performance, using models pre-stored and mapped to the site. This may ensure accurate and detailed data replacement guided by AI model performance and user input.

15 Claims, 12 Drawing Sheets

(56) References Cited

U.S. PATENT DOCUMENTS

| | | | | |
|---|---|---|---|---|
| 2021/0355884 | A1* | 11/2021 | Chae | B60K 35/10 |
| 2022/0003567 | A1* | 1/2022 | Kim | G01C 21/3446 |
| 2022/0180737 | A1* | 6/2022 | Kim | G08G 1/0112 |
| 2023/0012196 | A1* | 1/2023 | Abundis Vargas | G08G 1/096716 |
| 2023/0024838 | A1* | 1/2023 | Kim | G08G 1/0112 |
| 2023/0230476 | A1* | 7/2023 | Kim | G06N 3/0455 701/70 |
| 2023/0298461 | A1* | 9/2023 | Kim | G08G 1/0133 |
| 2024/0135805 | A1 | 4/2024 | Kim et al. | |
| 2024/0151550 | A1* | 5/2024 | Koo | B60W 60/001 |
| 2024/0195733 | A1* | 6/2024 | Sanvito | H04L 41/16 |

FOREIGN PATENT DOCUMENTS

| | | | |
|---|---|---|---|
| KR | 10-2022-0168409 | A | 12/2022 |
| KR | 10-2023-0066953 | A | 5/2023 |
| KR | 102628539 | B1 | 1/2024 |
| KR | 10-2024-0050821 | A | 4/2024 |
| KR | 10-2024-0059738 | A | 5/2024 |

* cited by examiner

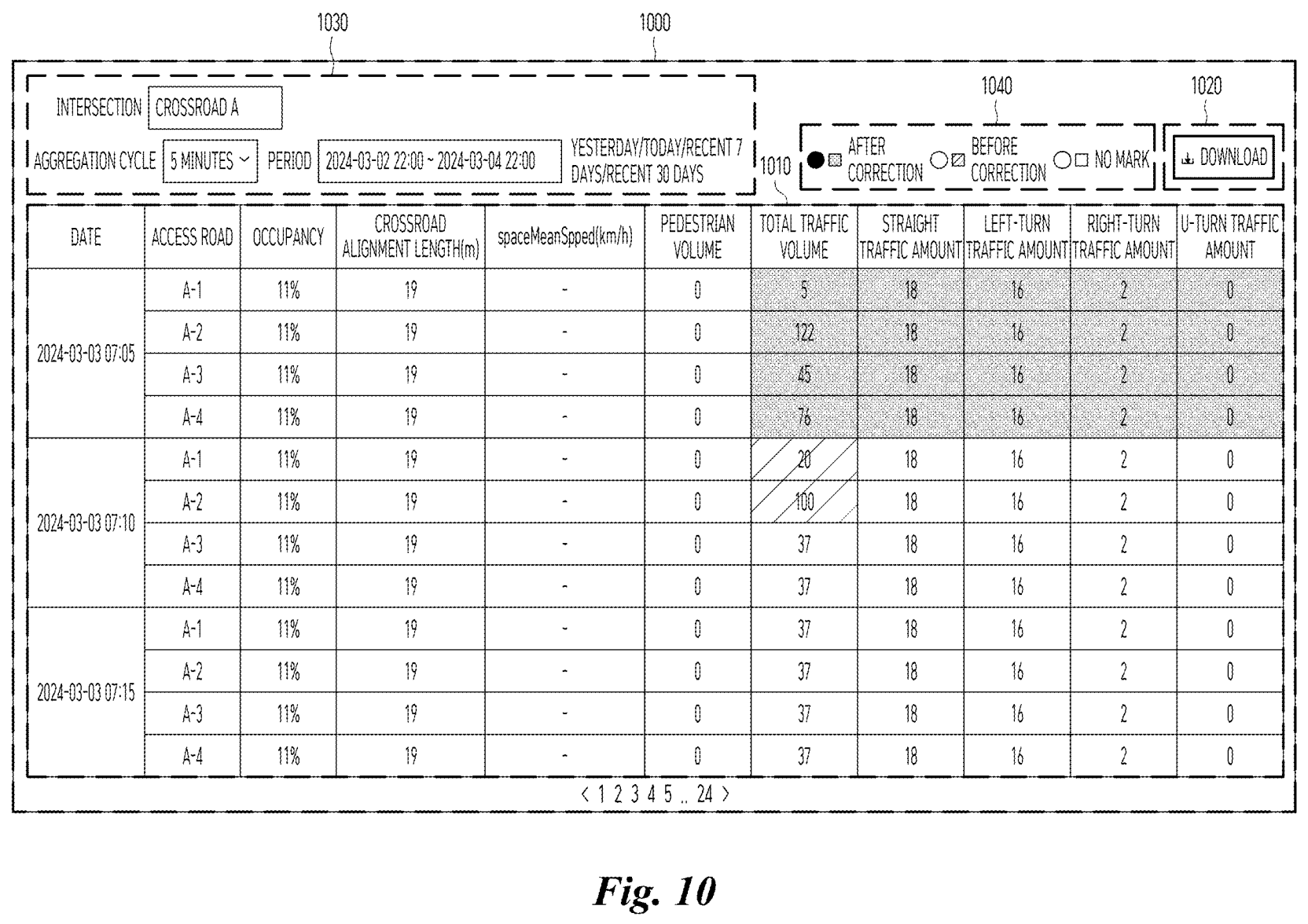

1000

1030

INTERSECTION CROSSROAD A

AGGREGATION CYCLE 5 MINUTES ⌄ PERIOD 2024-03-02 22:00 ~ 2024-03-04 22:00 YESTERDAY/TODAY/RECENT 7 DAYS/RECENT 30 DAYS

1040

● AFTER CORRECTION ○ BEFORE CORRECTION ○ NO MARK

1020

DOWNLOAD

1010

| DATE | ACCESS ROAD | OCCUPANCY | CROSSROAD ALIGNMENT LENGTH(m) | spaceMeanSpped(km/h) | PEDESTRIAN VOLUME | TOTAL TRAFFIC VOLUME | STRAIGHT TRAFFIC AMOUNT | LEFT-TURN TRAFFIC AMOUNT | RIGHT-TURN TRAFFIC AMOUNT | U-TURN TRAFFIC AMOUNT |
|---|---|---|---|---|---|---|---|---|---|---|
| 2024-03-03 07:05 | A-1 | 11% | 19 | - | 0 | 5 | 18 | 16 | 2 | 0 |
| | A-2 | 11% | 19 | - | 0 | 122 | 18 | 16 | 2 | 0 |
| | A-3 | 11% | 19 | - | 0 | 45 | 18 | 16 | 2 | 0 |
| | A-4 | 11% | 19 | - | 0 | 76 | 18 | 16 | 2 | 0 |
| 2024-03-03 07:10 | A-1 | 11% | 19 | - | 0 | 20 | 18 | 16 | 2 | 0 |
| | A-2 | 11% | 19 | - | 0 | 100 | 18 | 16 | 2 | 0 |
| | A-3 | 11% | 19 | - | 0 | 37 | 18 | 16 | 2 | 0 |
| | A-4 | 11% | 19 | - | 0 | 37 | 18 | 16 | 2 | 0 |
| 2024-03-03 07:15 | A-1 | 11% | 19 | - | 0 | 37 | 18 | 16 | 2 | 0 |
| | A-2 | 11% | 19 | - | 0 | 37 | 18 | 16 | 2 | 0 |
| | A-3 | 11% | 19 | - | 0 | 37 | 18 | 16 | 2 | 0 |
| | A-4 | 11% | 19 | - | 0 | 37 | 18 | 16 | 2 | 0 |

< 1 2 3 4 5 .. 24 >

*Fig. 10*

METHOD FOR REPLACING ABNORMAL TRAFFIC DATA

CROSS-REFERENCE TO RELATED APPLICATIONS

This application claims priority to and the benefit of Korean Patent Application No. 10-2024-0101866 and No. 10-2024-0101867 filed in the Korean Intellectual Property Office on Jul. 31, 2024, the entire contents of which are incorporated herein by reference.

BACKGROUND

Technical Field

This disclosure relates to data substitution technology, and more specifically, to a method for replacing abnormal traffic data.

Description of the Related Art

In general, traffic data can be collected through an electronic fluidized vehicle detector that obtains information about a vehicle using a conductor buried on a road, a closed circuit television (CCTV) camera installed on the road, or a speed detector installed on the road. The collected traffic data can be utilized in a process such as prediction or analysis related to a traffic volume.

The collected traffic data can include abnormal traffic data in addition to normal traffic data. For example, the abnormal traffic data can include anomaly data which is generated because a viewing angle of a camera is twisted due to an external environmental factor. Further, the abnormal traffic data can include missing data which is generated due to a network or service issue.

The traffic data cannot be smoothly analyzed due to the abnormal traffic data. Accordingly, in order to prevent an analysis error which occurs due to the abnormal traffic data, a methodology which efficiently processes the abnormal traffic data in entire traffic data can be required.

KR Patent Application Laid-Open No. 10-2024-0059738 discloses providing collected traffic information.

BRIEF SUMMARY

The present disclosure is contrived in response to the above-described background art, and has been made in an effort to provide a method for efficiently replacing abnormal traffic data.

The present disclosure is contrived in response to the above-described background art, and has been made in an effort to provide an interface for efficiently replacing abnormal traffic data.

Technical objects of the present disclosure are not restricted to the technical object mentioned above. Other unmentioned technical objects will be apparently appreciated by those skilled in the art by referencing the following description.

According to an embodiment of the present disclosure for solving the aforementioned task, a method for providing a user interface for replacing an abnormal traffic data in a computing device is disclosed. The method comprises: displaying on the user interface a target traffic data corresponding to a first site where a replacement task will be performed; in response to receiving a first user input that determines a target replacement period to be replaced within the target traffic data, displaying, on the user interface, performance information of at least one of a first set of artificial intelligence models mapped to the first site, and at least one candidate inference result from a first set of candidate inference results generated by each of the first set of artificial intelligence models; and in response to receiving a second user input that selects a target inference result from the candidate inference results or a target artificial intelligence model from the first set of artificial intelligence models, displaying on the user interface a replacement result in which the abnormal traffic data is replaced with a target inference result of the target artificial intelligence model on the target traffic data; and wherein the user interface comprises a second screen for allowing a verification of the replacement task, the second screen comprising: a second-first area displaying a chart indicating the target replacement period to be replaced within the target traffic data; and a second-second area displaying a list for the target replacement period and the performance information for each of multiple target replacement sub periods constituting the target replacement period; and wherein the second-second area: displays a replacement result in which a first target replacement sub period among the multiple target replacement sub periods is replaced with a first candidate inference result corresponding to first performance information, and displays a replacement result in which a second target replacement sub period among the multiple target replacement sub periods is replaced with a second candidate inference result corresponding to second performance information, and wherein an artificial intelligence model corresponding to the first performance information and an artificial intelligence model corresponding to the second performance information belong to the first set of artificial intelligence models pre-stored to be mapped to the first site.

In accordance with an embodiment, the user interface includes a first screen for allowing a registration of the replacement task, and the first screen comprises: a first-first area visually displaying the target traffic data; a first-second area displaying a default replacement list that includes at least one replacement period belonging to the abnormal traffic data; and a first-third area displaying an additional replacement list that includes at least one additional replacement period added by a user on the target traffic data.

In accordance with an embodiment, the first screen further includes: a first-fourth area displaying a location list comprising location identification information indicating each of multiple locations, including the first site.

In accordance with an embodiment, the target replacement period includes: a first target replacement period determined within the abnormal traffic data automatically determined on the target traffic data; and a second target replacement period added by a user on the target traffic data.

In accordance with an embodiment, the method further comprises: after displaying the at least one performance information and the at least one candidate inference result on the user interface, in response to receiving a third user input that changes the performance information, changing an artificial intelligence model to be used for a replacement task for a third target replacement sub period corresponding to changed performance information among the multiple target replacement sub periods, and changing a replacement result corresponding to the third target replacement sub period indicated on the chart based on the candidate inference result of the changed artificial intelligence model, and displaying the changed replacement result.

In accordance with an embodiment, the user interface includes a third screen for displaying a replacement result according to the replacement task in a first type of data structure, and on the third screen: a third-first area displaying the target traffic data before replacement, where the target inference result is not applied to the target replacement period, and a third-second area displaying the target traffic data after replacement, where the target inference result is applied to the target replacement period, are arranged to allow comparison between them.

In accordance with an embodiment, the user interface includes a fourth screen for displaying a replacement result according to the replacement task in a second type of data structure, and the fourth screen comprises: a fourth-first area displaying at least one of the following included in the replacement result: a traffic volume information at the first site, a traffic volume information per vehicle movement direction at the first site, a vehicle occupancy information within the first site, and a vehicle queue information within the first site; and a fourth-second area displaying an input object for providing the replacement result as a file.

In accordance with an embodiment, the user interface includes a fifth screen for registering a training dataset of an artificial intelligence model, and the fifth screen comprises: a fifth-first area allowing a user to select an interval on a chart indicating a traffic volume over time based on a first traffic raw data corresponding to the first site and visually indicating at least one selection interval selected by the user on the chart; and a fifth-second area displaying a list of the at least one selected interval as text, and wherein the training dataset is registered as data belonging to the at least one selection interval among a first traffic raw data.

In accordance with an embodiment, an artificial intelligence model trained with the registered training dataset is added to the first set of artificial intelligence models mapped to the first site.

In accordance with an embodiment, the user interface may include a sixth screen for selecting training datasets of the first set of artificial intelligence models, and the sixth screen may include a sixth-first area displaying a first training dataset list mapped to the first site, and allowing selection of training datasets to be included in the first set of artificial intelligence models, a sixth-second area visually displaying, on a chart representing a traffic amount over time of first traffic raw data corresponding to the first site, a period corresponding to the selected training dataset in the first training dataset list, and a sixth-third area displaying the period corresponding to the selected training dataset as a text.

In accordance with an embodiment, the sixth screen may further include a sixth-fourth area displaying a site list including site identification information representing each of the plurality of sites including the first site, and in response to a fourth user input of changing the site identification information in the site identification list on the sixth-fourth area, a changed training dataset list corresponding to the changed site identification information may be displayed in the sixth-first area.

In an embodiment, the site identification information may be constituted by a first indication for indicating a name or a location of a site and a second indication for indicating the number of artificial intelligence models mapped to the site.

In accordance with an embodiment, the at least one performance information includes a reliability of a corresponding artificial intelligence model or a reliability of a candidate inference result, and each of the candidate inference results includes a replacement data generated according to an inference result of a corresponding artificial intelligence model and information indicating a result of replacing the target replacement period with the replacement data.

In accordance with an embodiment, the target traffic data includes a chart indicating the abnormal traffic data on a first traffic raw data corresponding to the first site.

In accordance with an embodiment, the first traffic raw data includes traffic-related data processed from image data received via at least one camera installed at the first site, and wherein the traffic-related data includes at least one of traffic volume information of a site, traffic volume information per vehicle movement direction at a site, vehicle occupancy information within a site, and vehicle queue information within a site.

In accordance with an embodiment, the abnormal traffic data includes missing data corresponding to a time period in which traffic-related data less than a predetermined threshold is obtained from the first traffic raw data and is automatically determined independently of a user input.

In accordance with an embodiment, a computer program stored in a non-transitory computer-readable medium is disclosed. the computer program causes a processor of a computing device to perform a method for providing a user interface for replacing abnormal traffic data. the method comprises: displaying on the user interface a target traffic data corresponding to a first site where a replacement task will be performed; in response to receiving a first user input that determines a target replacement period to be replaced within the target traffic data, displaying, on the user interface, performance information of at least one of a first set of artificial intelligence models mapped to the first site, and at least one candidate inference result from a first set of candidate inference results generated by each of the first set of artificial intelligence models; and in response to receiving a second user input that selects a target inference result from the candidate inference results or a target artificial intelligence model from the first set of artificial intelligence models, displaying on the user interface a replacement result in which the abnormal traffic data is replaced with a target inference result of the target artificial intelligence model on the target traffic data; and wherein the user interface comprises a second screen for allowing a verification of the replacement task, the second screen comprising: a second-first area displaying a chart indicating the target replacement period to be replaced within the target traffic data; and a second-second area displaying a list for the target replacement period and the performance information for each of multiple target replacement sub periods constituting the target replacement period; and wherein the second-second area: displays a replacement result in which a first target replacement sub period among the multiple target replacement sub periods is replaced with a first candidate inference result corresponding to first performance information, and displays a replacement result in which a second target replacement sub period among the multiple target replacement sub periods is replaced with a second candidate inference result corresponding to second performance information, and wherein an artificial intelligence model corresponding to the first performance information and an artificial intelligence model corresponding to the second performance information belong to the first set of artificial intelligence models pre-stored to be mapped to the first site.

In accordance with an embodiment, a computing device for providing a user interface for replacing abnormal traffic data is disclosed. The computing device comprises: a processor, a memory and a network unit. the processor performs: displaying on the user interface the target traffic data corresponding to a first site where a replacement task will be performed; in response to receiving a first user input that determines a target replacement period to be replaced within the target traffic data, displaying, on the user interface, the performance information of at least one of the first set of artificial intelligence models mapped to the first site, and at least one candidate inference result from the first set of candidate inference results generated by each of the first set of artificial intelligence models; and in response to receiving a second user input that selects a target inference result from the candidate inference results or a target artificial intelligence model from the first set of artificial intelligence models, displaying on the user interface a replacement result in which the abnormal traffic data is replaced with the target inference result of the target artificial intelligence model on the target traffic data; wherein the user interface comprises a second screen for allowing verification of the replacement task, the second screen comprising: a second-first area displaying a chart indicating the target replacement period to be replaced within the target traffic data; and a second-second area displaying a list for the target replacement period and the performance information for each of multiple target replacement sub-periods constituting the target replacement period; wherein the second-second area: displays a replacement result in which a first target replacement sub-period among the multiple target replacement sub-periods is replaced with a first candidate inference result corresponding to first performance information, and displays a replacement result in which a second target replacement sub-period among the multiple target replacement sub-periods is replaced with a second candidate inference result corresponding to second performance information; and wherein an artificial intelligence model corresponding to the first performance information and an artificial intelligence model corresponding to the second performance information belong to the first set of artificial intelligence models prestored to be mapped to the first site.

According to an embodiment of the present disclosure, abnormal traffic data included in entire traffic data is efficiently replaced to perform meaningful analysis and prediction tasks for the entire traffic data.

According to an embodiment of the present disclosure, an interface for simply and efficiently replacing the abnormal traffic data is provided to a user to easily and conveniently replace the abnormal traffic data.

Effects which can be acquired in the present disclosure are not limited to the aforementioned effects and other unmentioned effects will be clearly understood by those skilled in the art from the following description.

BRIEF DESCRIPTION OF THE SEVERAL VIEWS OF THE DRAWINGS

Various aspects are now described with reference to the drawings and like reference numerals are generally used to designate like elements. In the following embodiments, for purposes of explanation, numerous specific details are set forth to provide a comprehensive understanding of one or more aspects. However, it will be apparent that the aspect(s) can be executed without the detailed matters.

FIG. 10 is a diagram illustrating a fourth screen for displaying the replacement results in a second type of data structure according to an embodiment of the present disclosure.

DETAILED DESCRIPTION

Figure 1:
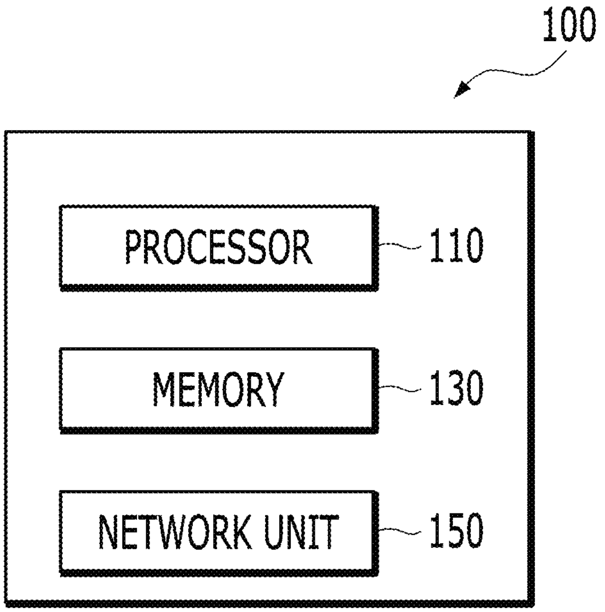
FIG. 1 is a diagram for describing a computing device for replacing abnormal traffic data according to an embodiment of the present disclosure.

Various embodiments will be described with reference to drawings. In the specification, various descriptions are presented to provide appreciation of the present disclosure. However, it is clear that these embodiments can be implemented without this specific description.

The terms "component," "module," "system" and the like which are terms used in the specification refer to a computer-related entity, hardware, firmware, software, a combination of the software and the hardware, or execution of the software. For example, the component may be a processing procedure executed on a processor, the processor, an object, an execution thread, a program, and/or a computer, but is not limited thereto. For example, both an application executing on a computing device and a computing device may be components. One or more components may reside within the processor and/or a thread of execution. The component may be localized in one computer. One component may be distributed between two or more computers. Further, the components may be executed by various computer-readable media having various data structures, which are stored therein. The components may perform communication through local and/or remote processing according to a signal (for example, data from one component that interacts with other components and/or data from other systems transmitted through a network such as the Internet through a signal in a local system and a distribution system) having one or more data packets, for example.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "or" and "and/or" used in this specification designates and includes all available combinations of one or more items among enumerated related items.

Further, it should be appreciated that the term "comprise/include" and/or "comprising/including" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

In addition, the term "at least one of A or B" should be interpreted to mean "a case including only A," "a case including only B," and "a case in which A and B are combined."

Those skilled in the art need to recognize that various illustrative logical blocks, configurations, modules, circuits, means, logic, and algorithmic steps described in connection with the embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled technicians may implement the functionality described in various ways for each specific application. However, decisions regarding such implementations should not be construed as deviating from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

Terms expressed as N-th such as first, second, or third in the present disclosure are used to distinguish at least one entity. For example, entities expressed as first and second may be the same as or different from each other.

In addition, the term "~etc.," such as "A, B, etc.," should be interpreted to mean "a case including only A," "a case including only B," and "a case in which A and B are combined."

FIG. 1 is a diagram for describing a computing device for replacing abnormal traffic data according to an embodiment of the present disclosure.

Referring to FIG. 1, the computing device 100 for replacing abnormal traffic data may include a processor 110, a memory 130, and a network unit 150. The constitution of the computing device 100 is an example schematically illustrated, and an additional component may be included in the computing device 100, or some of the components of the computing device 100 may be excluded or replaced. As an example, when the computing device 100 includes a user terminal, an output unit (not illustrated) and an input unit (not illustrated) may be included in a scope of the computing device 100. As an example, when the computing device 100 is a terminal device including a camera which obtains traffic data, a photographing unit (not illustrated) may be included in a range of the computing device 100.

In an embodiment, the computing device 100 may be a traffic control server which collects data related to traffic, edits, and modifies the data, and controls the traffic based on the collected data. The server may include an output unit and an input unit for interacting with a user. In an embodiment, the computing device 100 may perform a method for replacing abnormal traffic data by utilizing an artificial intelligence technology. The processor 110 may perform a method for providing a user interface for replacing the abnormal traffic data by utilizing the artificial intelligence technology.

In an embodiment, the processor 110 may be constituted by at least one core, and include processors for data analysis and processing, such as a central processing unit (CPU), a general purpose graphics processing unit (GPGPU), a tensor processing unit (TPU), etc., of the computing device 100.

In an embodiment of the present disclosure, the processor 110 may perform an operation for learning the neural network. For example, the processor 110 may perform calculations for learning the neural network, which include processing of input data for learning in deep learning (DL), extracting a feature in the input data, calculating an error, updating a weight of the neural network using backpropagation, and the like. At least one of the CPU, the GPGPU, and the TPU of the processor 110 may process learning of the network function. For example, the CPU and the GPGPU may process the learning of the network function and data classification using the network function. Further, in an embodiment of the present disclosure, learning of the network function and data classification using the network function may also be processed by using processors of a plurality of computing devices.

In an embodiment, the processor 110 may generally control the overall operation of the computing device 100. The processor 110 may provide or process appropriate information or functions to a user by processing signals, data, information, and the like input or output through components included in the computing device 100, or by driving an application program stored in the memory 130.

In an embodiment, the memory 130 may store various types of information generated or determined by the processor 110 and/or various types of information received by the network unit 150. For example, the memory 130 may store traffic raw data and artificial intelligence models corresponding to each of multiple sites.

In an embodiment, the memory 130 may include at least one type of a flash memory type, a hard disk type, a multimedia card micro type, a card type memory (e.g., SD or XD memory), a random access memory (RAM), a static random access memory (SRAM), a read-only memory (ROM), an electrically erasable read-only memory (EPROM), a programmable read-only memory (PROM), a magnetic memory, a magnetic disk, and/or an optical disk. The computing device 100 may operate in association with a web storage that performs a storage function of the memory 130 on the Internet. Description of the memory described above is only an example, and the present disclosure is not limited thereto. The memory 130 may be operated by the processor 110.

In an embodiment, the network unit 150 may include any wired or wireless communication network capable of transmitting and receiving any form of data and signals in the network expressed in the present disclosure. The techniques described in the present specification may be used in other networks as well as the networks mentioned above.

In the present disclosure, the computing device 100 may be used in the sense of encompassing any form of server and any form of terminal.

In an embodiment, the server may include, for example, various types of computing system or computing device such as a microprocessor, a mainframe computer, a digital processor, a portable device, and a device controller.

In one embodiment, the server may include a storage unit for storing data and/or information used in the present disclosure. This storage unit may be contained within the server or managed under the control of the server. In another example, the storage unit may be external to the server and implemented in a form that can communicate with the server. In this case, the storage unit may be managed and controlled by an external server different from the server. The aforementioned storage unit may be used interchangeably with memory 130.

In an embodiment, the terminal may include any type of terminal that may interact with a server or other computing device. The terminal may include, for example, a mobile phone, a smart phone, a laptop computer, a personal digital assistant (PDA), a slate PC, a tablet PC, and an ultrabook, and the like.

Figure 2:
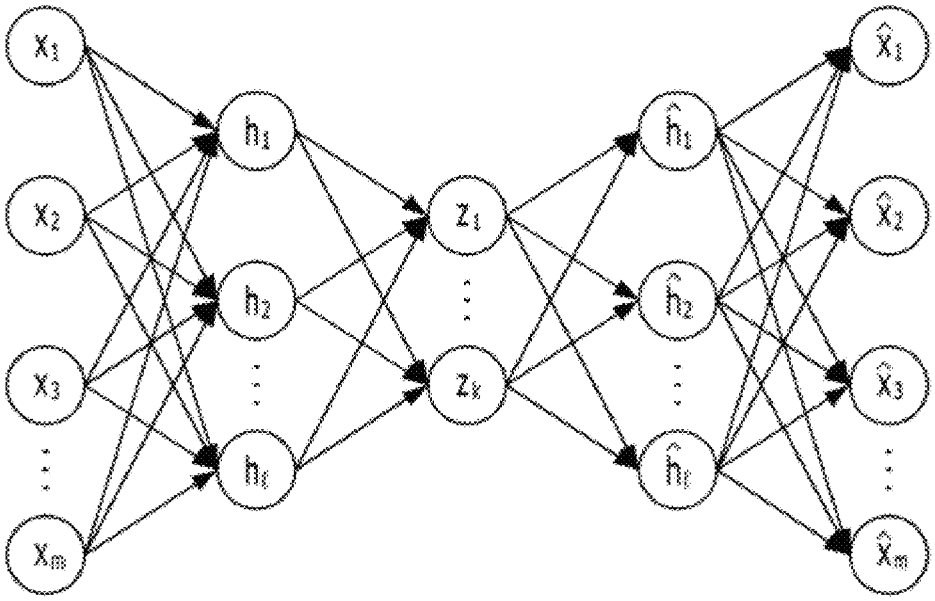
FIG. 2 is a diagram illustrating an exemplary structure of an artificial intelligence model according to an embodiment of the present disclosure.

FIG. 2 illustrates an illustrative structure of an artificial intelligence model according to an embodiment of the present disclosure.

Throughout the present specification, artificial intelligence models, artificial intelligence-based models, computational models, neural networks, network functions, and neural networks may be used interchangeably.

The neural network may be generally constituted by an aggregate of calculation units which are mutually connected to each other, which may be called "node". The nodes may also be called neurons. The neural network is configured to include one or more nodes. The nodes (or neurons) constituting the neural networks may be mutually connected to each other by one or more links.

In the neural network, one or more nodes connected through the link may relatively form a relationship between an input node and an output node. Concepts of the input node and the output node are relative and a predetermined node which has the relationship of the output node with respect to one node may have the relationship of the input node in the relationship with another node and vice versa. As described above, the relationship of the output node to the input node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable, and the weight may be varied by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links. For example, when the same number of nodes and links exist and two neural networks in which the weight values of the links are different from each other exist, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed from the initial input node up to the corresponding node. However, definition of the layer is predetermined for description and the order of the layer in the neural network may be defined by a method different from the aforementioned method. For example, the layers of the nodes may be defined by the distance from a final output node.

In an embodiment of the present disclosure, the set of the neurons or the nodes may be defined as the expression "layer".

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network.

In the neural network according to an embodiment of the present disclosure, the number of nodes of the input layer may be the same as the number of nodes of the output layer, and the neural network may be a neural network of a type in which the number of nodes decreases and then increases again from the input layer to the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another embodiment of the present disclosure, the number of nodes of the input layer may be larger than the number of nodes of the output layer, and the neural network may be a neural network of a type in which the number of nodes increases from the input layer to the hidden layer. The neural network according to still yet another embodiment of the present disclosure may be a neural network of a type in which the neural networks are combined.

The artificial intelligence-based model according to an embodiment of the present disclosure may include a deep neural network (DNN). The deep neural network (DNN)

may mean a neural network including a plurality of hidden layers other than the input layer and the output layer. When the deep neural network is used, the latent structures of data may be identified. That is, photographs, text, video, voice, protein sequence structure, genetic sequence structure, peptide sequence structure, potential structure of music (e.g., what objects are in the photo, what is the content and emotions of the text, what contents and emotions of the voice, etc.), and/or the binding affinity between the peptide and the MHC may be identified. The deep neural network may include convolutional neural network (CNN), recurrent neural network (RNN), auto encoder, generative adversarial networks (GAN), restricted Boltzmann machine (RBM), deep belief network (DBN), Q network, U network, Siamese network, etc. The description of the deep neural network described above is just an example and the present disclosure is not limited thereto.

The artificial intelligence based model of the present disclosure may be expressed by a network structure of an arbitrary structure described above, including the input layer, the hidden layer, and the output layer.

The neural network that may be used in the artificial intelligence-based model of the present disclosure may be learned in at least one of supervised learning, unsupervised learning, semi-supervised learning, transfer learning, active learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Disclosed is a computer-readable medium storing a data structure according to an embodiment of the present disclosure. The above-described data structure may be stored in the storage of the present disclosure, executed by a processor, and transmitted and received by the communication unit.

The data structure may refer to the organization, management, and storage of data that enables efficient access to and modification of data. The data structure may refer to the organization of data for solving a specific problem (e.g., data analysis, data search, data storage, data modification). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device may perform operations while using the resources of the computing device to a minimum. Specifically, the computing device may increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, an artificial intelligence-based model, a computational model, a neural network, a network function, and a neural network may be used interchangeably. Hereinafter, a neural network is unified and described. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called "node". The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight may be varied by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, R-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example, and the present disclosure is not limited thereto.

The artificial intelligence based model according to an embodiment of the present disclosure may include a large language model (LLM). The large language model in the present disclosure may mean an artificial intelligence based model trained by using a vast amount of learning data to perform natural language processing. The large language model may include the transformer, an encoder-series model of the transformer, and/or a decoder-series model of the transformer. The encoder-series model of the transformer may correspond to an artificial intelligence model using an encoder structure of the transformer. The decoder-series model of the transformer may correspond to an artificial intelligence model using a decoder structure of the transformer.

In an embodiment, the transformer may be constituted by an encoder that encodes input data and a decoder that decodes the encoded data. The transformer may have a structure which inputs a series of input data, and outputs a series of output data through encoding and decoding steps. In an embodiment, the series of input data may be processed in a form which is enabled to be computed by the transformer. A process of processing the series of input data in the form which is enabled to be computed by the transformer may include a tokenizing process and an embedding process. The tokenizing process may mean a process of dividing the series of input data into tokens of a predetermined unit. For example, the predetermined unit may include a word unit. The embedding process may mean a process of transforming at least one token tokenized from the series of input data into an embedding vector.

In an embodiment, the transformer may acquire an embedding vector to be input into the encoder by combining a token embedding vector which embeds at least one token corresponding to the series of input data, a segment embedding vector which segments a sentence including a token for each token, and a position embedding vector to which a position of the token is reflected. The encoder-series model and the decoder-series model of the transformer may also acquire the embedding vector by performing the same scheme.

In an embodiment, in order for the transformer to encode and decode a series of input data, the encoder and the decoder within the transformer may utilize an attention algorithm. The attention algorithm may mean an algorithm that calculates a similarity by applying a SoftMax function to an attention score acquired by a matrix product of a query and a key with respect to a given query, and calculates an attention value for the query by a matrix product of the calculated similarity and a value.

In an embodiment, a self-attention algorithm may mean an attention algorithm that uses the query, the key, and the value generated by multiplying the same embedding vector by each of a query weight, a key weight, and a value weight. A cross attention algorithm may mean an attention algorithm that uses a query generated by multiplying a first embedding vector by the query weight, and a key and a value generated by multiplying a second embedding vector by the key weight and the value weight, respectively. The query weight, the key weight, and the value weight may be trainable parameters which are updated through a training process of a large language model.

In an embodiment, the encoder of the transformer may include an embedding layer, a self-attention layer in which the self-attention algorithm is applied to the embedding vector, a normalization layer, and a feed forward neural network (FFN). Further, the encoder may have a form in which N unit structures including the self-attention layer, the normalization layer, and the feed forward neural network are connected. The decoder of the transformer may include the embedding layer, a masked self-attention layer, the normalization layer, a cross attention layer to which the cross attention layer algorithm is applied, and the feed forward neural network. Further, the decoder may have a form in which N unit structures including the masked self-attention layer, the normalization layer, the cross attention layer, and the feed forward neural network are connected. The masked self-attention layer may correspond to a layer that obtains attention value each of the sequences sequentially including words in a plurality of words included in the series of input data.

The transformer may also include additional components such as a linear layer, a SoftMax layer, etc., in addition to the encoder and the decoder. Each of the encoder-series model of the transformer and the decoder-series model of the transformer may also include the additional components in addition to the encoder and the decoder. A method for constituting the transformer by using the attention algorithm may include a method disclosed in Vaswani et al., Attention Is All You Need, 2017 NIPS, which is incorporated herein by reference.

In an embodiment, the attention layer such as the self-attention layer, the masked self-attention layer, the cross attention layer, etc., may correspond to a multi-head attention layer including a plurality of attention layers in parallel. The multi-head attention layer matrix-concatenates attention values output from the plurality of attention layers, respectively, and matrix-multiplies the concatenated matrix by an output weight to output an output attention value. An output attention value output from the multi-head attention layer may have the same size as an attention value output from one attention layer.

In an embodiment, the transformer may be trained through a masked language model (MLM) process, a next sentence prediction (NSP) process, etc. The MLM process may mean a training process that predicts a masked word through a series of training data in which some words are masked. The NSP process may mean a training process that discriminates whether two sentences are concatenated in a series of training data including any two sentences.

In an embodiment, the large language model may process various data formats including image data, audio data, video data, etc., in addition to a natural language text. In order to transform data with various data formats into a series of data that are computable, the large language model may embed the data. The large language model may process additional data expressing a relative positional relationship or phase relationship between a series of input data. Alternatively, the series of input data may be embedded by additionally reflecting vectors expressing relative positional relationships or phase relationships between the input data to the series of input data. In one example, the relative positional relationship between a series of input data may include a word order within the natural language sentence, a relative positional relationship of respective segmented images, a temporal order of segmented audio waveforms, etc., but is not limited thereto. A process of adding information expressing a relative positional relationship or phase relationship between a series of input data may be referred to as positional encoding.

One example (Vision Transformer, ViT) of the large language model which processes image data is disclosed in Dosovitskiy, et al., AN IMAGE IS WORTH 16×16 WORDS: TRANSFORMERS FOR IMAGE RECOGNITION AT SCALE, which is incorporated herein by reference.

The artificial intelligence model according to an embodiment of the present disclosure may include a multi-modal large language model. The multi-modal large language model may mean a large language model that may understand and process a relationship between different data formats including natural language text data, image data, audio data, video data, etc. The multi-modal language model may include a plurality of encoders which encode input data corresponding to each data format. The multi-modal language model may be trained to calculate a similarity between embedding vectors encoded from the encoder, which have respective data formats through training data including data with different data formats, calculate a similarity for the same pair to be higher, and calculate a similarity for different pairs to be lower.

One example (Contrastive Language-Image Pre-training, CLIP) of the multi-modal large language model which understands and processes the relationship between the image data and the natural language text data is disclosed in Alec Radford, et al., LEARNING TRANSFERABLE VISUAL MODELS FROM NATURAL LANGUAGE SUPERVISION, which is incorporated herein by reference.

Figure 3:
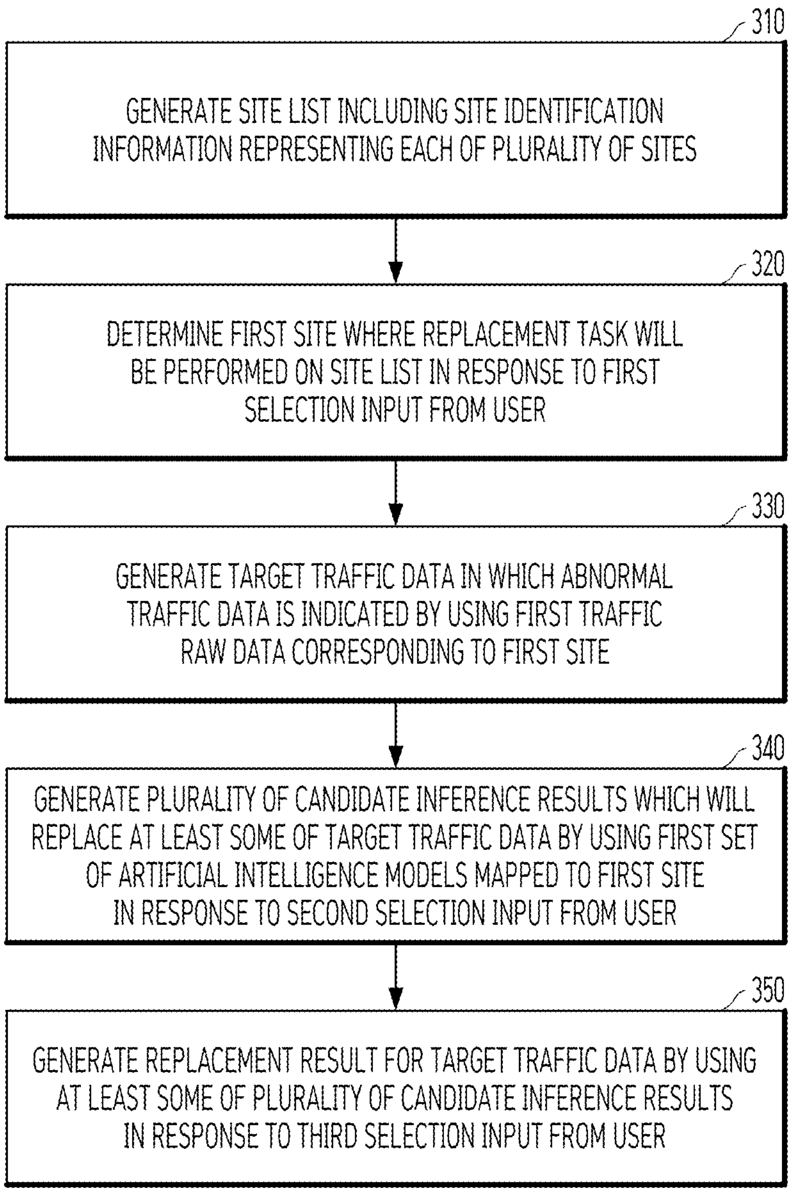
FIG. 3 is a diagram illustrating a method for replacing abnormal traffic data according to an embodiment of the present disclosure.

FIG. 3 is a diagram illustrating a method for replacing abnormal traffic data according to an embodiment of the present disclosure. Steps illustrated in FIG. 3 are exemplary steps. Therefore, it will also be apparent to those skilled in the art that some of the steps of FIG. 3 may be omitted or there may be additional steps within a range without departing from a spirit scope of the present disclosure. In an embodiment, the examples illustrated in FIG. 3 may be performed by the computing device 100 (for example, the processor 110 of the computing device 100).

In an embodiment, the computing device 100 may receive, in each of a plurality of sites, data related to traffic at a corresponding site. For example, the computing device 100 may receive traffic raw data from a camera installed at an intersection. In an embodiment, the computing device 100 may generate traffic data by analyzing and processing the received traffic raw data. In an embodiment, the computing device 100 may perform a task of replacing the abnormal traffic data among the traffic data by interacting with the user.

Hereinafter, the method for replacing the abnormal traffic data performed by the computing device 100 will be described below in detail.

In an embodiment, the computing device 100 may generate a site list including site identification information indicating each of a plurality of sites (310).

In the present disclosure, the site may mean a location, an area, etc., where the traffic data is collected. For example, the site may include a specific road, a specific intersection, etc.

In the present disclosure, the site identification information may mean data, information, etc., used for defining and recognizing a specific site. For example, the site identification information may include location information (e.g., coordinates, etc.), address information, terrain information, information on a company which exists at the site, information on an accident which occurs at the site, name information (e.g., an interaction name, an access road name, etc.) of the site, etc.

For example, the site in the present disclosure may correspond to the intersection, and the site identification information may indicate any type of information for identifying the intersection.

The computing device 100 may determine a first site where a replacement task will be performed on a site list in response to a first selection input from a user (320).

The replacement task in the present disclosure may mean a process of changing abnormal traffic data to other data (e.g., normal data or data predicted as normal, or data in which a possibility of normality is equal to or more than a predetermined threshold reference).

In an embodiment, the first selection input may mean a selection related to the site. For example, the first selection input may include an input of selecting the site where the replacement task will be performed in the site list.

In the present disclosure, the replacement task may mean a task of changing a part corresponding to the abnormal traffic data to other data (e.g., the normal data or the data predicted as normal, or the data in which the possibility of the normality is equal to or more than the predetermined threshold reference).

For example, the replacement task may include a task of deleting the abnormal traffic data, and inputting output data output by using a pretrained artificial intelligence model into the deleted part. As another example, the replacement task may include a task of replacing the abnormal traffic data with the output data output by using the pretrained artificial intelligence model. In an embodiment, the replaced abnormal traffic data may not be deleted, but may be separately stored and managed in the memory 130 of the computing device 100 or another storage.

For example, the replacement task may mean a task of replacing the abnormal traffic data with another data output according to the user selection input.

The computing device 100 may generate target traffic data in which the abnormal traffic data is indicated by using first traffic raw data corresponding to a first site (330).

In the present disclosure, the target traffic data may be traffic data corresponding to the site where the replacement task will be performed. For example, the target traffic data may include traffic data obtained at an intersection where the replacement task will be performed. As an example, the target traffic data or traffic data may include 2D data representing a traffic amount over time.

In the present disclosure, the traffic raw data may mean data acquired by processing data received through a traffic data collection device (e.g., a camera, a sensor, etc.) installed at a corresponding site. As a postprocessing process for the traffic raw data processed by the computing device 100 or the collection device is applied, the traffic data may be generated. By using image type or sensor value type data, traffic raw data related to appearance and movement of a vehicle over time may be generated. The traffic raw data may be generated as any type of rule-based algorithm and/or an artificial intelligence-based algorithm having the image type or sensor value type data as an input is used. As an example, the traffic raw data may include chart data representing the traffic amount over time.

In the present disclosure, the traffic raw data may also mean data received through the traffic data collection device (e.g., the camera, the sensor, etc.) installed at the corresponding site. In such an embodiment, the traffic raw data may include the image type or sensor value type data.

In an embodiment, the first traffic raw data may include traffic related data acquired by processing image data received through at least one camera installed at the first site.

In an embodiment, the traffic related data may mean various information regarding traffic. For example, the traffic related data may include at least one of traffic amount information of a site, traffic amount information for each vehicle movement direction at the site, vehicle occupancy information within the site, and/or vehicle waiting line information within the site.

In an embodiment, the abnormal traffic data may data indicating deviation from a normal traffic pattern, there is no data related to appearance or movement of the vehicle, or an expected phenomenon. For example, the abnormal traffic data may include anomaly data which is data corresponding to a period wrongly measured due to an external environmental factor. As another example, the abnormal traffic data may include missing data which is data corresponding to a period which is not measured due to a network or service issue. As an example, the anomaly data may include data regarding a situation in which the traffic amount is abnormal. As an example, traffic data in which there is a traffic amount or traffic data of an amount equal to or less than a threshold may be defined as the missing data.

In an embodiment, the abnormal traffic data may include missing data corresponding to a time period during which traffic related data of an amount less than a predetermined threshold is obtained on the first traffic raw data acquired by processing image data received through at least one camera installed at the first site. For example, when the predetermined threshold is 10 megabytes per minute, the missing data may be data during a time period during which traffic related data less than 10 megabytes per minute is obtained on the traffic raw data.

In an embodiment, the abnormal traffic data may include missing data discriminated based on a ratio of a time period during which data is obtained to a predetermined time period in the image data received through eat least one camera installed at the first site. For example, the missing data may be determined by comparing the ratio of the time period during which the data is obtained to the predetermined time period and a threshold. For example, when the ratio of the time period during which the data is obtained to the predetermined time period is equal to or less than 90%, the corresponding time period may be discriminated as the missing data.

In an embodiment, the abnormal traffic data may be automatically determined independently of an input of the user. For example, the missing data included in the abnormal traffic data may be automatically determined independently regardless of the input of the user. For example, the computing device 100 may automatically generate the missing data by applying a predetermined rule-based algorithm or an artificial intelligence-based algorithm onto the traffic data. For example, when a quantitative value of the traffic data obtained per time is equal to or less than a threshold reference, the computing device 100 may determine traffic data for the corresponding time period as the abnormal traffic data.

In an embodiment, at least some of the target traffic data may include a target replacement period to be replaced within the target traffic data.

In an embodiment, the target replacement period may be a time period determined as to performing replacement within the target traffic data. For example, the target replacement period may include one or more continuous or spaced target replacement sub periods. As another example, the target replacement period may include at least one of a first target replacement period determined within the abnormal traffic data automatically on the target traffic data and/or a second target replacement period added by the user on the target traffic data.

The computing device 100 may generate a plurality of candidate inference results which is to replace at least some of the target traffic data by using a first set of artificial intelligence models mapped to the first site in response to a second selection input from the user (340).

In the present disclosure, the artificial intelligence model may include eXtreme Gradient Boosting (XGBoost). The XGBoost as an algorithm based on Gradient Boosting performs a cross verification every repeated performance to determine the optimized number of times. Accordingly, the XGBoost is repeatedly performed at the determined number of times, and then, a value predicted in a final model may be determined as a final value. The XGBoost may be operated to input data (e.g., 2D chart data, 1D text data, etc.) of a target replacement period which becomes a target of replacement, and output a replacement result corresponding to the target replacement period. In order to implement such an operation, the XGBoost may be trained by using a training dataset including another traffic data at a corresponding site. The artificial intelligence model in the present disclosure may also include another artificial intelligence model described in FIG. 2, etc.

In an embodiment, one artificial intelligence model among the first set of artificial intelligence models may correspond to one candidate inference result. For example, a plurality of artificial intelligence models may be provided to be mapped or applied to a specific site, and each of the plurality of artificial intelligence models may output or generate one candidate inference result.

In an embodiment, the second selection input may mean a selection related to the replacement task. For example, the second selection input may include an input of selecting the target replacement period during which the replacement task will be performed on the abnormal traffic data of the target traffic data. As another example, the second selection input may include an input of adding the target replacement period when selecting the target replacement period when the replacement task will be performed on a charge indicating a traffic amount over time of the target traffic data. As yet another example, the second selection input may include an input for triggering generation of a plurality of candidate inference results for the target replacement period. As still yet another example, the second selection input may include an input for starting the replacement task for the target replacement period.

In an embodiment, the computing device 100 may perform registration and/or selection of the training dataset of the artificial intelligence model before the step (310) of generating the site list including the site identification information indicating each of the plurality of sites. A specific description of the registration and/or selection of the training dataset of the artificial intelligence model will be described later with reference to FIGS. 11 and 12.

In an embodiment, the computing device 100 may train each of the artificial intelligence models mapped to each site after the step of performing the registration and/or selection of the training dataset of the artificial intelligence model.

In an embodiment, each of one set of artificial intelligence models mapped to each site may be pretrained based on a training dataset determined within traffic raw data corresponding to the mapped site. For example, each of the first set of artificial intelligence models mapped to the first site may be pretrained based on the first training dataset determined within the first traffic raw data. As another example, a second set of artificial intelligence models mapped to a second site different from the first site among the plurality of sites may be pretrained based on a second training dataset determined within second traffic raw data corresponding to the second site.

In an embodiment, one intersection corresponding to the site may include a plurality of access roads. For example, the first intersection may be constituted by a first access road, a second access road, a third access road, and a fourth access road. In an embodiment, one set of artificial intelligence models may be mapped to the plurality of access roads, respectively. For example, one or more artificial intelligence models may be mapped to one access road. Accordingly, one intersection, a plurality of access roads corresponding to one intersection, and one set of artificial intelligence models corresponding to the plurality of access roads may be associated with and mapped to each other.

In an embodiment, the training dataset may be determined as data selected by the user within the traffic raw data of the corresponding site. For example, the first training dataset may be determined as data which belong to at least one first selection period selected by the user on a chart indicating a traffic amount over time of the first traffic raw data. In an embodiment, the training dataset may be pre-provided before performing the replacement task, and an artificial intelligence model corresponding to (applicable or dedicated to) a specific intersection or a specific access road of the specific intersection may be generated by using the pre-provided training dataset. For example, an artificial intelligence model may be trained by using a training dataset including a first time period (rainy evening time) under the same site, and another artificial intelligence model may be trained by using a training dataset including a second time period (clear lunch time) under the same site. The artificial intelligence models may be managed while being mapped to the corresponding site, and may serve as candidate artificial intelligence models for replacing the abnormal traffic data for the corresponding site.

In an embodiment, the computing device 100 may allow the user to select one artificial intelligence model among the candidate artificial intelligence models for each target replacement period for a specific site. In an embodiment, the computing device 100 may allow the user to select one artificial intelligence model among the candidate artificial intelligence models for each target replacement period for a specific site and for each of the plurality of sub sites.

In an embodiment, each of the plurality of candidate inference results may mean a result value output from the corresponding artificial intelligence model. For example, each of the plurality of candidate inference results may include a reliability for the corresponding artificial intelligence model and/or a reliability for the candidate inference result. As an example, the reliability is an output value or a value quantitatively indicating accuracy of a model itself, and it may be interpreted as the higher the value of the reliability, the higher the output or the accuracy of the model itself. As another example, each of the plurality of candidate inference results may include replacement data generated according to the inference result of the corresponding artificial intelligence model. As yet another example, each of the plurality of candidate inference results as replacement data generated according to the inference result of the corresponding artificial intelligence may include a candidate replacement result indicating a result of replacing at least some of the target traffic data.

In the present disclosure, the replacement data may be traffic data generated according to the inference result of the corresponding artificial intelligence model. For example, the replacement data may be a traffic amount at a specific intersection or a specific access road of the specific intersection.

In an embodiment, the computing device 100 may generate first replacement data which is to replace at least some of the target traffic data by using a first artificial intelligence model among the first set of artificial intelligence models.

In an embodiment, the computing device 100 may generate second replacement data which is to replace at least some of the target traffic data by using a second artificial intelligence model among the first set of artificial intelligence models.

As described above, different types of replacement data for the same target called the target traffic data may be generated from the plurality of artificial intelligence models, respectively, and the replacement data may serve as candidate replacement data for being selected by the user.

In an embodiment, the computing device 100 may generate a first candidate inference result in which the first replacement data is reflected to the target traffic data.

In an embodiment, the computing device 100 may generate a second candidate inference result in which the second replacement data is reflected to the target traffic data.

As described above, different types of candidate reference results for the same target called the target traffic data may be generated from the plurality of artificial intelligence models, respectively, and the candidate inference results may serve as candidate options for being selected by the user.

In an embodiment, the first artificial intelligence model and the second artificial intelligence model may be pretrained by using training dataset of which at least some are different. In an embodiment, the first artificial intelligence model and the second artificial intelligence model may be pretrained by using training datasets corresponding to different periods among the first traffic raw data. For example, the first artificial intelligence model and the second artificial intelligence model may be trained by using traffic raw data of different time periods under the same site.

The computing device 100 may generate the replacement result for the target traffic data by using at least some of the plurality of candidate inference results in response to a third selection input from the user (350).

In an embodiment, the computing device 100 may generate the replacement result for the target traffic data by filling the target replacement period with one candidate inference result among the plurality of candidate inference results.

In an embodiment, the third selection input may mean a selection related to the application or reflection of the replacement task. For example, the third selection input may include a selection input of applying one candidate inference result among the plurality of candidate inference results with respect to each of a plurality of target replacement periods included in at least some of the target traffic data.

In an embodiment, the target traffic data may include sub target traffic data corresponding to the plurality of sub sites constituting the first site. For example, when the first site is the intersection, the plurality of sub sites may mean areas (e.g., access roads) corresponding to roads in respective directions within the intersection. In an embodiment, it may be characterized in that access directions of the vehicle at the plurality of respective sub sites are different from each other.

The set of the artificial intelligence models in the present disclosure may be mapped by the unit of the site (e.g., intersection). The set of the artificial intelligence models in the present disclosure may be mapped by the unit of the sub site (e.g., the access road of the intersection).

The training datasets in the present disclosure may be mapped by the unit of the site (e.g., intersection). The training datasets in the present disclosure may be mapped by the unit of the sub site (e.g., the access road of the intersection).

In an embodiment, the third selection input may include a selection input of applying one candidate inference result among the plurality of candidate inference results with respect to each of the plurality of sub sites.

In an embodiment, the replacement result may be data related to a result of replacing the target traffic data with at least some of the plurality of candidate inference results. For example, the replacement result may include target traffic data after replacement. The target traffic data after replacement may be data in which the replacement data generated according to the third selection input is reflected to the target traffic data.

In an embodiment, the replacement result may include chart data comparably representing the target traffic data after replacement and target traffic data before replacement in which the replacement data is not reflected to the target traffic data.

In an embodiment, the computing device 100 may generate a replacement result of replacing at least one of traffic amount information of the first site, traffic amount information for each vehicle movement direction of the first site, vehicle occupancy information within the first site, and/or vehicle waiting line information within the first site in the target traffic data as a downloadable file.

In an embodiment, the computing device 100 may a process for performing the replacement task differently according to determining whether there is the mapped training dataset or artificial intelligence model at a site which becomes the replacement target.

In an embodiment, the computing device 100 may determine whether there is the mapped artificial intelligence model at a first site after the step (320) of determining the first site. In an embodiment, the computing device 100 may determine whether is the mapped training dataset at the first site after the step (320) of determining the first site.

In an embodiment, the computing device 100 may perform a process of determining a third training dataset for training a third artificial intelligence model to be mapped to the first site when there is no mapped artificial intelligence model at the first site.

In an embodiment, the computing device 100 may perform the process of determining the third training dataset for training the third artificial intelligence model to be mapped to the first site when there is no training dataset mapped to the first site.

In an embodiment, the process of determining the third training dataset may determine the third training dataset within the first traffic raw data in response to a fourth selection input from the user.

In an embodiment, the process of determining the training dataset may include receiving a period selection input from the user on traffic raw data corresponding to a specific site or a specific sub site, and determining a training dataset based on the received period selection input.

In an embodiment, the fourth selection input may mean a selection related to the training dataset. For example, the fourth selection input may include an input of selecting a period to be included in the training dataset within the first traffic raw data.

In an embodiment, the computing device 100 may train the third artificial intelligence model by using the third training dataset. In an embodiment, the third artificial intelligence model trained by the third training dataset may be included in the first set of artificial intelligence models.

In an embodiment, the third training dataset may be determined as data which belongs to at least one second selection period selected by the user on the chart indicating the traffic amount over time of the first traffic raw data.

In an embodiment, the computing device 100 may determine a plurality of candidate training datasets applicable to the first site before the step (330) of generating the plurality of candidate interference results.

In an embodiment, the computing device 100 may generate a plurality of candidate inference results which is to replace at least some of the target traffic data by using the first set of artificial intelligence models generated based on at least one candidate training dataset determined according to a fifth selection input from the user among the plurality of candidate training datasets in response to the second selection input from the user.

In an embodiment, the fifth selection input may mean a selection of the training dataset during the process of executing the replacement task.

In an embodiment, the computing device 100 may determine the plurality of candidate training datasets applicable to the first site before the step (340) of generating the plurality of candidate interference results.

In an embodiment, the computing device 100 may determine at least one candidate training dataset according to a sixth selection input from the user among the plurality of determined candidate training datasets.

In an embodiment, the sixth selection input may mean a selection of determining the training dataset corresponding to the first site in the step of registering the training data before the replacement task.

In an embodiment, when at least one candidate training dataset is determined, a first set of artificial intelligence models corresponding to at least one determined candidate training dataset may be generated.

Figure 4:
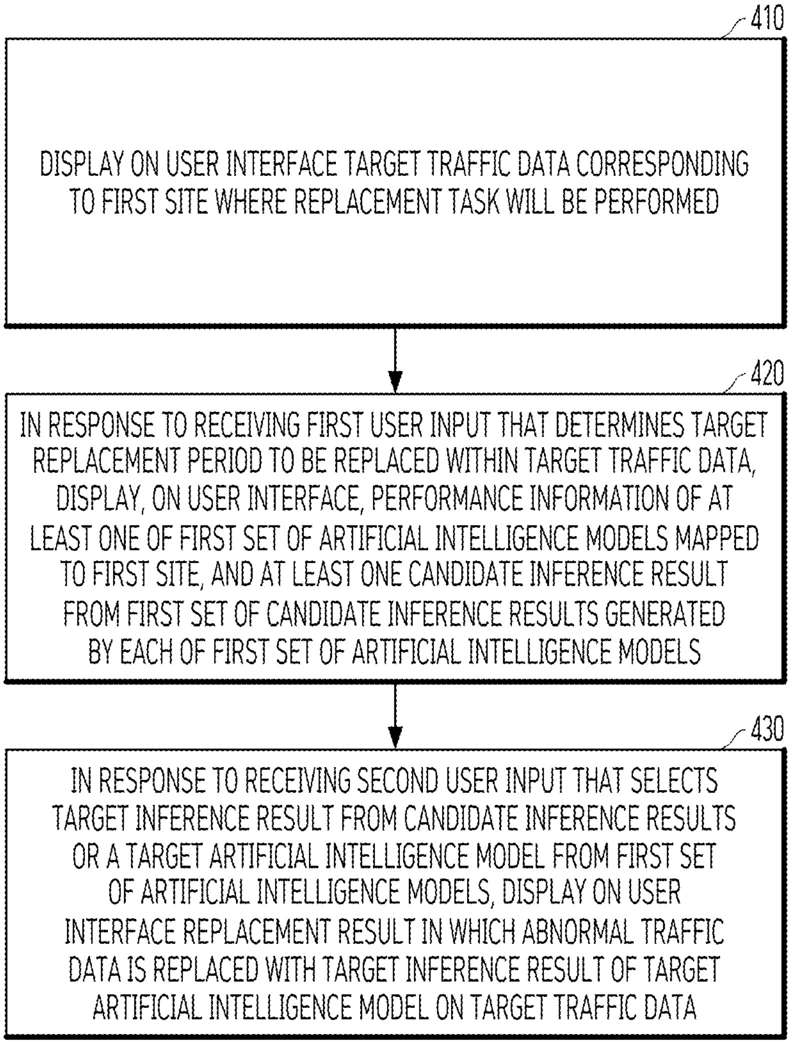
FIG. 4 is a diagram illustrating a method for providing a user interface for replacing abnormal traffic data according to an embodiment of the present disclosure.

FIG. 4 is a diagram illustrating a method for providing a user interface for replacing abnormal traffic data according to an embodiment of the present disclosure. Steps illustrated in FIG. 4 are exemplary steps. Therefore, it will also be apparent to those skilled in the art that some of the steps of FIG. 4 may be omitted or there may be additional steps within a range without departing from a spirit scope of the present disclosure. In an embodiment, the examples illustrated in FIG. 4 may be performed by the computing device 100 (for example, the processor 110 of the computing device 100). A detailed description of a redundant component in FIG. 4 may be omitted, and may be replaced with contents described above with reference to FIGS. 1 to 3.

Referring to FIG. 4, the computing device 100 may display, on the user interface, the target traffic data corresponding to the first site where the replacement task will be performed (410).

In an embodiment, the target traffic data may include a charge generated based on traffic raw data corresponding to the corresponding site. For example, the target traffic data may include a charge displaying the abnormal traffic data on the first traffic raw data corresponding to the first site.

In an embodiment, the first traffic raw data may include traffic related data acquired by processing image data received through at least one camera installed at the first site.

In an embodiment, the traffic related data may include at least one of traffic amount information of a site, traffic amount information for each vehicle movement direction at the site, vehicle occupancy information within the site, and/or vehicle waiting line information within the site.

In an embodiment, the abnormal traffic data may include missing data corresponding to a time period during which traffic related data of an amount less than a predetermined threshold is obtained on the first traffic raw data. The abnormal traffic data may be automatically determined independently of an input of the user.

In an embodiment, the computing device 100 may display, on the user interface, performance information of at least one of the first set of artificial intelligence models mapped to the first site and at least one candidate inference result among the first set of candidate inference results generated by the first set of artificial intelligence models, respectively, in response to receiving the first user input of determining the target replacement period to be replaced within the target traffic data.

In an embodiment, at least one performance information may be information for evaluating a corresponding artificial intelligence model. For example, at least one performance information may include a reliability for the corresponding artificial intelligence model. As another example, at least one performance information may include a reliability for a candidate inference result of the corresponding artificial intelligence model. As an example, the reliability may be displayed in a form of a number or displayed as an image (e.g., a change of a color, a size of an icon, etc.).

Each of the candidate inference results may include replacement data generated according to an inference result of the corresponding artificial intelligence model and information indicating a result of replacing the target replacement period with the replacement data.

The computing device 100 may display, on the user interface, a replacement result in which the abnormal traffic data is replaced with the target inference result of the target artificial intelligence model on the target traffic data in response to receiving the second user input of selecting the target inference result among the candidate inference results or the target artificial intelligence model among the first set of artificial intelligence models (430).

In an embodiment, the replacement result may include data before the abnormal traffic data is replaced and after the abnormal traffic data is replaced. The replacement result displays the abnormal traffic data or the result of replacing the abnormal traffic data to be distinguished from another data on the traffic data to allow the user to more intuitively confirm a result for the replacement task. The replacement result may be displayed on the user interface in order to comparably show data before and after replacement on one screen.

A specific description of the user interface will be described later with reference to FIGS. 5 to 12.

Figure 5:
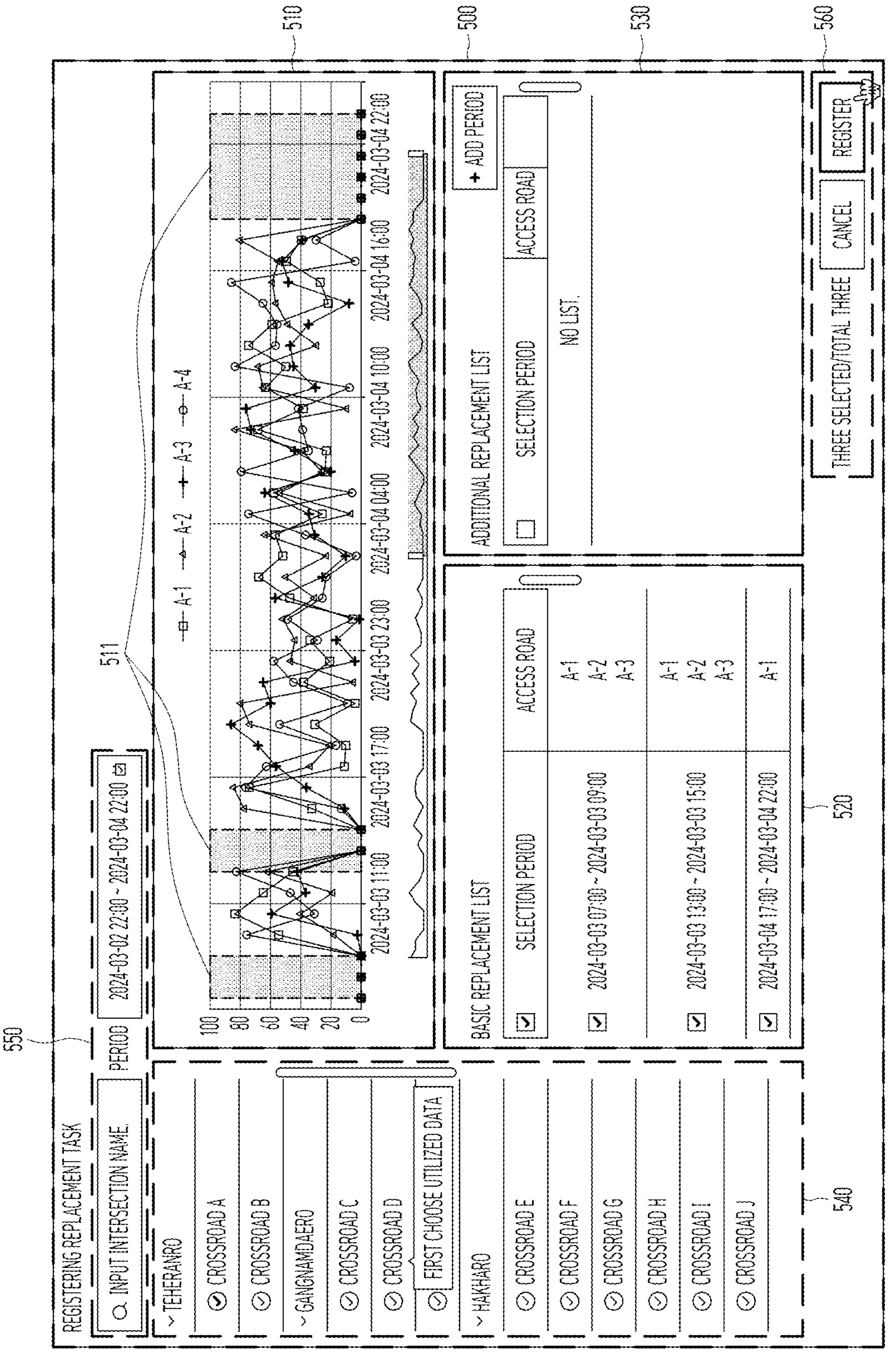
FIG. 5 is a diagram illustrating a first screen for registering a replacement task according to an embodiment of the present disclosure.

FIG. 5 is a diagram illustrating a first screen for registering a replacement task according to an embodiment of the present disclosure.

Referring to FIG. 5, the user interface may include a first screen 500 for allowing registration of the replacement task. A specific description of a redundant component in FIG. 5 may be omitted, and may be replaced with contents described above with reference to FIGS. 1 to 4.

In an embodiment, the first screen 500 may include a plurality of areas. The first screen 500 may include at least one area of a first-first area 510. a first-second area 520, a first-third area 530, a first-fourth area 540, a first-fifth area 550, and/or a first-sixth area 560.

In an embodiment, the first-first area 510 may visually display the target traffic data. For example, the first-first area 510 may display target traffic data including at least one replacement period 511 which belongs to the abnormal traffic data as the chart. For example, the first-first area 510 may visually display 2D traffic data indicating the traffic amount over time. For example, the replacement period 511 on the first-first area 510 may be displayed to be distinguished from another traffic data on the first-first area 510. For example, the replacement period 511 is highlighted to allow the user to more intuitively confirm the corresponding replacement period (e.g., abnormal traffic data). In an embodiment, a location of the first-first area 510 may be an upper portion on the first screen 500 output by the output unit of the computing device 100.

In the present disclosure a horizontal axis of the chart of the target traffic data may be a time. The time may be placed time series. A vertical axis of the chart of the target traffic data may be data regarding the traffic amount. The data regarding the traffic amount may indicate a ratio of a current traffic amount based on a maximum traffic amount at the corresponding site. The data regarding the traffic amount may indicate a quantitative numerical value of the traffic amount at the corresponding site. In an embodiment, the chart of the target traffic data may be displayed in 2D in one area so as to distinguish A-1, A-2, A-3, and A-4 corresponding to access roads within the intersection. For example, the chart of the target traffic data may include a line graph which displays respective traffic amounts of A-1, A-2, A-3, and A-4 for each time, and displays lines connected for each access road.

In an embodiment, the first-second area 520 may display a basic replacement list including at least one replacement period which belongs to the abnormal traffic data. The first-second area 520 may be an area selecting whether to perform the replacement task from the user for each replacement period on the basic replacement list. In an embodiment, a location of the first-second area 520 may be a bottom left portion of the first-first area 510 on the first screen 500 output by the output unit of the computing device 100.

In an embodiment, the first-third area 530 may display an additional replacement list including at least one additional replacement period added by the user on the target traffic data. The first-third area 530 may be an area selecting whether to perform the replacement task from the user for each additional replacement period on an additional replacement list. In an embodiment, a location of the first-third area 530 may be a bottom right portion of the first-first area 510 on the first screen 500 output by the output unit of the computing device 100.

In an embodiment, a first-fourth area 540 may display a site list including site identification information indicating each of the plurality of sites including the first site. Whether each site included in the site list is currently selected and/or whether each site is selectable may be differently displayed. For example, a current selected site, a selectable site, and a selection impossible site may be displayed to be distinguished from each other. The current selected site and the selectable site may be a site to which the training data or the artificial intelligence model is mapped. The selection impossible site may be a site to which the training data or the artificial intelligence model is not mapped. In an embodiment, a location of the first-fourth area 540 may be a left portion of the first-first area 510 and the first-second area 520 on the first screen 500 output by the output unit of the computing device 100.

In an embodiment, a first-fifth area 550 may display at least one of a search field which searches a desired site in the site list and/or information (e.g., a collection period of the target traffic data, etc.) on target traffic data corresponding to a selected site (e.g., the first site, etc.). In an embodiment, a location of the first-fifth area 540 may be above the first-first area 510 and the first-fourth area 540 on the first screen 500 output by the output unit of the computing device 100.

In an embodiment, a first-sixth area 560 may display the number of all replacement periods and/or the number of replacement periods selected among all replacement periods. The first-sixth area 560 may include at least one of a registration object for registration as the replacement task and/or a cancellation object for canceling the replacement task. In an embodiment, a location of the first-sixth area 560 may be below the first-third area 530 on the first screen 500 output by the output unit of the computing device 100.

In the present disclosure the object may be a set of pictures, symbols, or texts corresponding to programs, instructions, or data, respectively. The object may be used for receiving an input, a selection input, etc., of the user.

However, the locations of the first-first area 510 the first-second area 520, the first-third area 530, the first-fourth area 540, the first-fifth area 550, and the first-sixth area 560 are not limited thereto.

Figure 6:
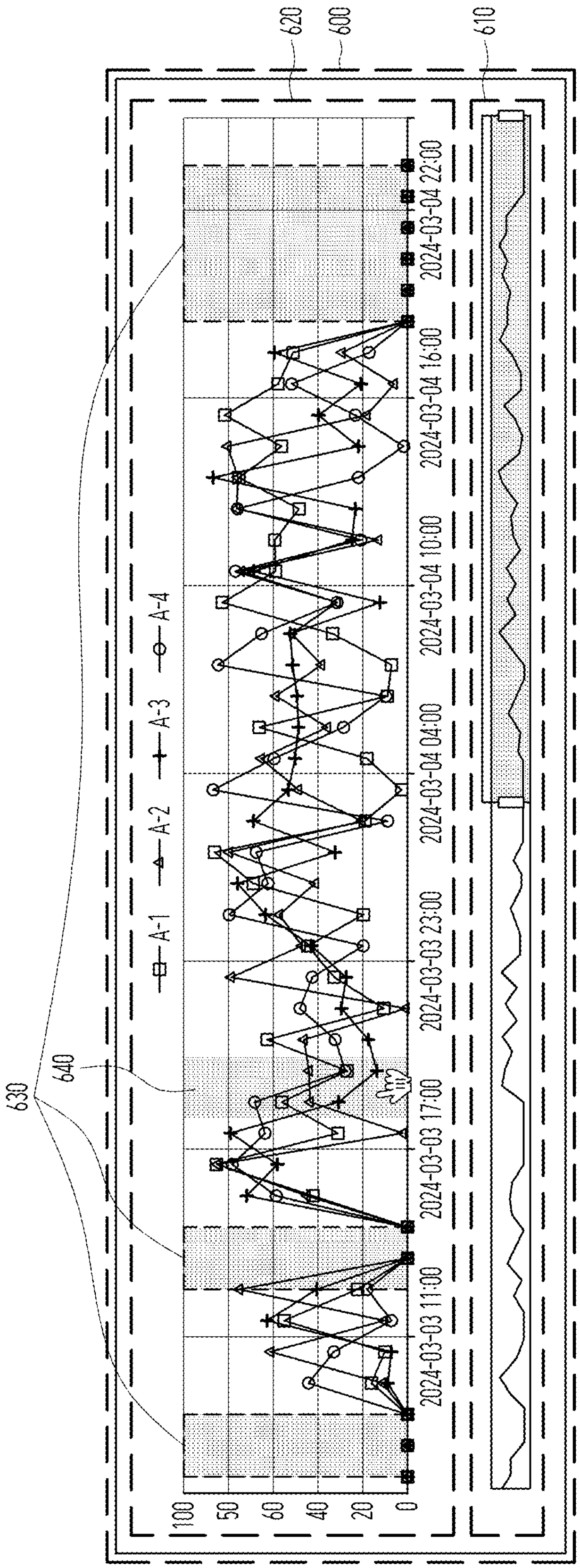
FIG. 6 is a diagram illustrating a first-first area of a first screen for registering the replacement task according to an embodiment of the present disclosure.

FIG. 6 is a diagram illustrating a first-first area of a first screen for registering the replacement task according to an embodiment of the present disclosure.

Referring to FIG. 6, a first-first area 600 may include a first-first 'a' area 610 and/or a first-first 'b' area 620. A specific description of a redundant component in FIG. 6 may be omitted, and may be replaced with contents described above with reference to FIGS. 1 to 5.

The first-first 'a' area 610 may visually display a period which is to be displayed as the chart on the target traffic data. The period which is to be displayed as the chart on the target traffic data may be predetermined or determined by the user. In an embodiment, a location of the first-first 'a' area 610 may be a lower portion within the first-first area 600.

The first-first 'b' area 620 may display, as the chart, target traffic data including at least one replacement period 630 which belongs to the abnormal traffic data and an additional replacement period 640 added by the user. In an embodiment, a location of the first-first 'b' area 620 may be an upper portion within the first-first area 600. For example, the location of the first-first 'b' area 620 may be above the first-first 'a' area 610.

However, the locations of the first-first 'a' area 610 and the first-first 'b' area 620 are not limited thereto.

Figure 7:
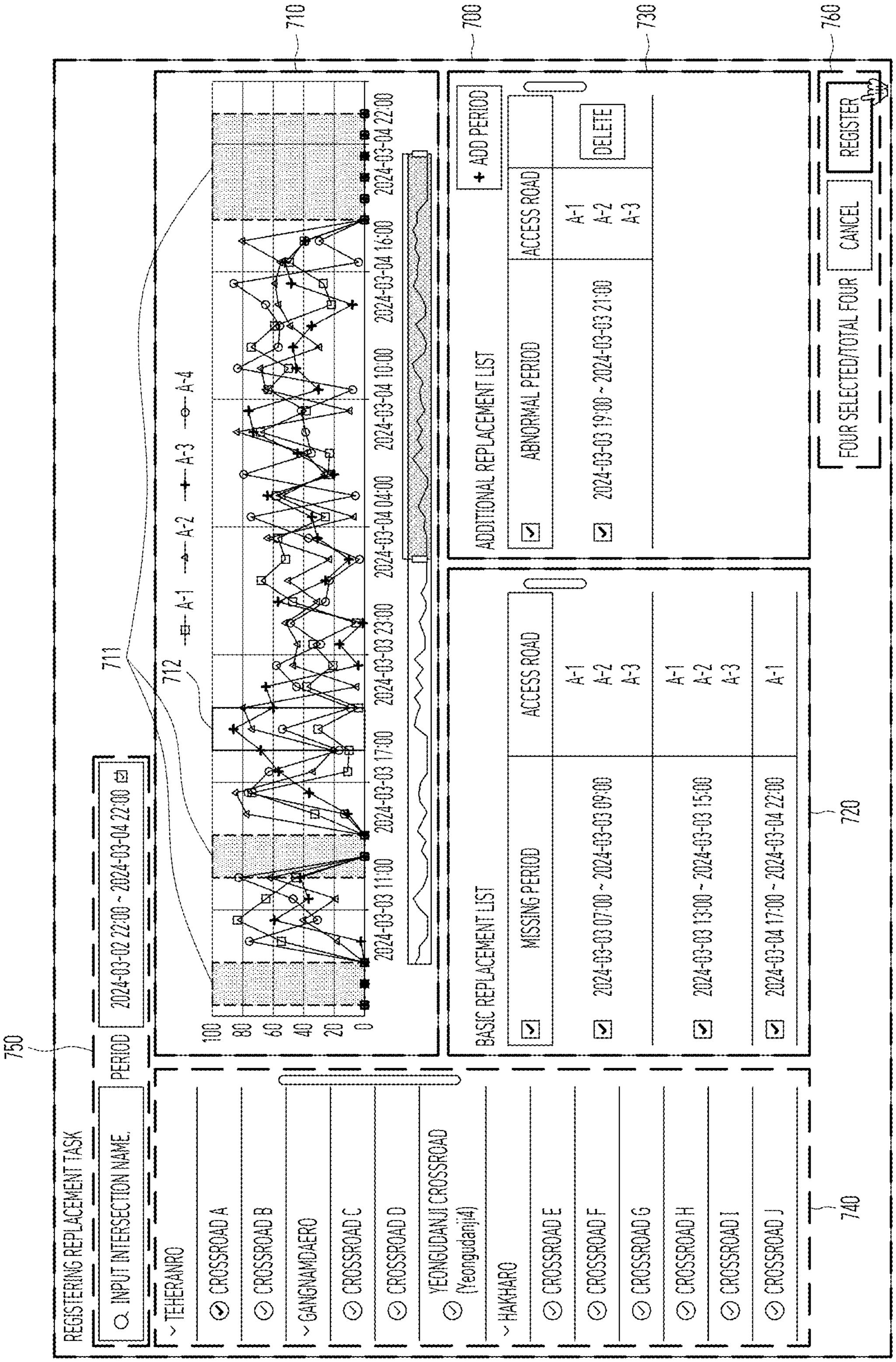
FIG. 7 is a diagram illustrating a first screen for registering a replacement task according to another embodiment of the present disclosure.

FIG. 7 is a diagram illustrating a first screen for registering a replacement task according to another embodiment of the present disclosure.

Referring to FIG. 7, the user interface may include a first screen 700 for allowing registration of the replacement task. A detailed description of a redundant component in FIG. 7 may be omitted, and may be replaced with contents described above with reference to FIGS. 1 to 6.

In an embodiment, the first screen 700 may include at least one area of a first-first area 710, a first-second area 720, a first-third area 730, a first-fourth area 740, a first-fifth area 750, and/or a first-sixth area 760.

When the first screen 500 of FIG. 5 and the first screen 700 of FIG. 7 are compared, as an additional replacement period 712 is added to the first-first area 710, the first screen 700 may display information corresponding to the additional replacement period 712 on the first-third area 730, and may additionally display the number of all replacement periods onto the first-sixth area 760 as large as the number of additional replacement periods 712.

In an embodiment, the replacement period 711 and the additional replacement period 712 on the first-first area 710 may be displayed to correspond to each other or displayed to be distinguished from each other. For example, the replacement period 711 and the additional replacement period 712 may be displayed by a highlight display scheme to be distinguished from other items on the first-first area 710. For example, the same highlight scheme is applied to the replacement period 711 and the additional replacement period 712, which may be displayed to correspond to each other. As another example, the replacement period 711 is highlighted, and the additional replacement period 712 is displayed in a form of an empty box, so that the replacement period 711 and the additional replacement period 712 may be displayed to be distinguished from each other. As yet another example, the replacement period 711 and the additional replacement period 712 may be displayed to be distinguished from items having different colors of outer shapes of periods.

In an embodiment, the additional replacement period may include at least one first sub site selected by the user among a plurality of sub sites (e.g., a plurality of access roads) constituting a site. For example, the additional replacement period 712 of FIG. 7 may include A-1, A-2, and A-3 which are access roads selected by the user among the plurality of access roads A-1, A-2, A-3, and A-4 constituting the first site. The user may select at least one first sub site among the plurality of sub sites in the additional replacement period.

Figure 8:
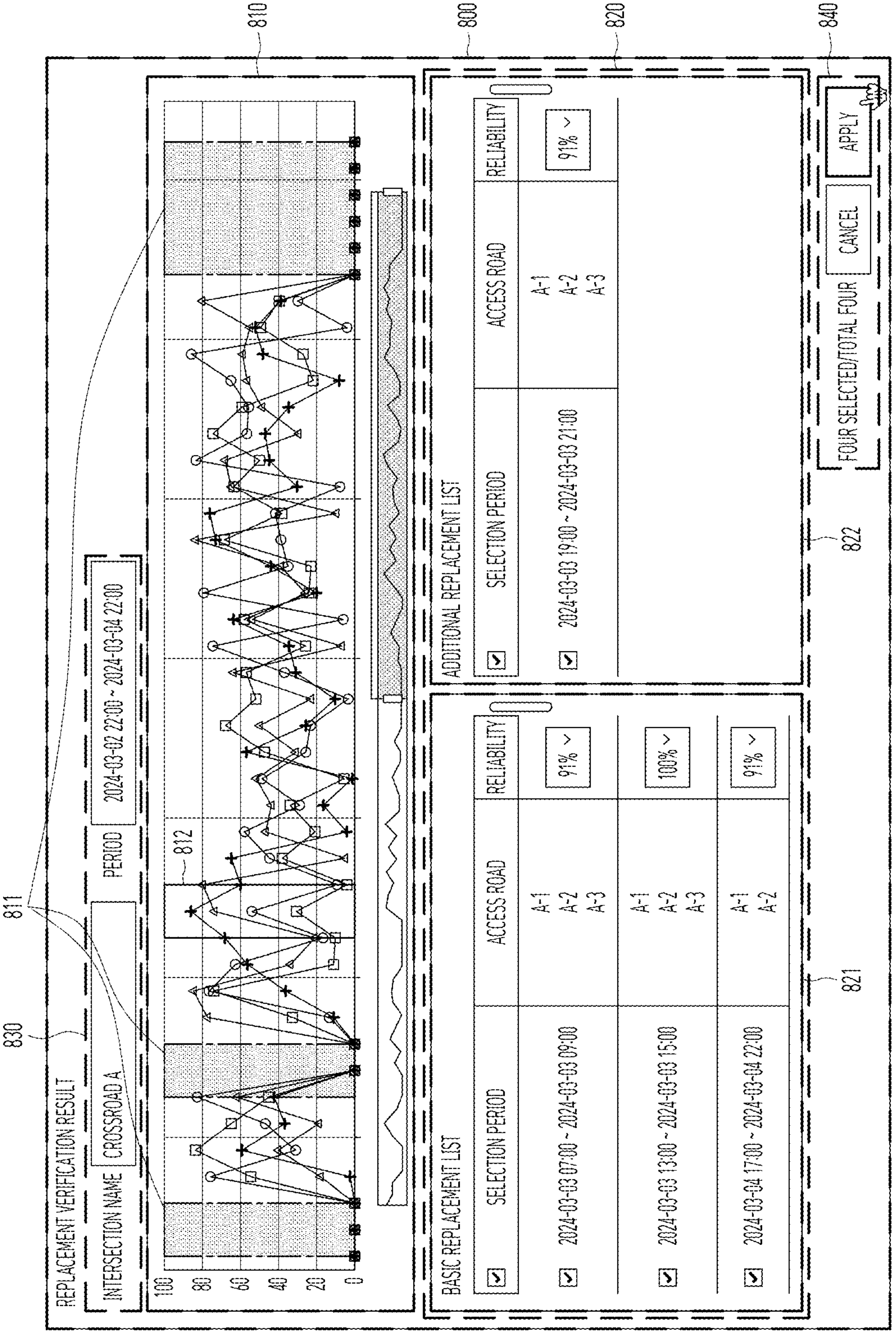
FIG. 8 is a diagram illustrating a second screen for verifying the replacement task according to an embodiment of the present disclosure.

FIG. 8 is a diagram illustrating a second screen for validating the replacement task according to an embodiment of the present disclosure.

Referring to FIG. 8, the user interface may include a second screen 800 for allowing verification of the replacement task. A detailed description of a redundant component in FIG. 8 may be omitted, and may be replaced with contents described above with reference to FIGS. 1 to 7.

In an embodiment, the second screen 800 may include at least one area of a second-first area 810, a second-second area 820, a second-third area 830, and a second-fourth area 840.

In an embodiment, the second-first area 810 may display a chart which displays the target replacement period to be replaced within the target traffic data. The target replacement period may include a first target replacement period 811 selected by the user on a basic replacement list and/or a second target replacement period 812 selected by the user on an additional replacement list. The first target replacement period 811 may be determined within the abnormal traffic data automatically determined on the target traffic data. The second target replacement period 812 may be added by the user on the target traffic data. In an embodiment, a location of the second-first area 810 may be an upper portion on the second screen 800 output by the output unit of the computing device 100.

In an embodiment, the second-second area 820 may display a list for the target replacement period. The second-second area 820 may display at least one performance information for each of a plurality of target replacement sub periods constituting the target replacement period.

In an embodiment, the second-second area 820 may display a replacement result replaced with a first candidate inference result corresponding a first performance information in a first target replacement sub period among the plurality of target replacement sub periods. The second-second area 820 may display a replacement result replaced with a second candidate inference result corresponding a second performance information in a second target replacement sub period among the plurality of target replacement sub periods.

In an embodiment, an artificial intelligence model corresponding to the first performance information and an artificial intelligence model corresponding to the second performance information may belong to a first set of artificial intelligence models prestored to be mapped to the first site.

In an embodiment, the second-second area 820 may include a second-second 'a' area 821 and/or a second-second 'b' area 822.

In an embodiment, the second-second 'a' area 821 may display a list corresponding to the first target replacement period 811. The second-second 'a' area 821 may display at least one performance information for each of the plurality of target replacement sub periods constituting the first target replacement period 811.

In an embodiment, the second-second 'b' area 822 may display a list corresponding to the second target replacement period 812. The second-second 'b' area 822 may display at least one performance information for each of the plurality of target replacement sub periods constituting the second target replacement period 812.

In an embodiment, when at least one performance information for each of the plurality of target replacement sub periods constituting the target replacement period displayed in the second-second area 820 is changed, an inference result of the artificial intelligence model corresponding to the changed performance information is reflected to the target replacement period of the second-first area 810, so a chart of the second-first area 810 may be changed. For example, in response to receiving a third user input of changing the performance information after the step (420) of displaying at least one performance information and at least one candidate inference result on the user interface, the computing device 100 may change an artificial intelligence model to be used for the replacement task for a third target replacement sub period corresponding to the changed performance information among the plurality of target replacement sub periods. The computing device 100 may change a replacement result corresponding to the third target replacement sub period displayed on the chart based on a candidate inference result of the changed artificial intelligence model, and displayed the changed replacement result. In an embodiment, a location of the second-second area 820 may be below the second-first area 810 on the second screen 800 output by the output unit of the computing device 100.

In an embodiment, a second-third area 830 may display at least one of identification information for a selected site (e.g., the first site, etc.) and/or information (e.g., the collection period of the target traffic data, etc.) on target traffic data corresponding to the selected site (e.g., the first site, etc.). In an embodiment, a location of the second-third area 830 may be above the second-first area 810 on the second screen 800 output by the output unit of the computing device 100.

In an embodiment, a second-fourth area 840 may display the number of all replacement periods and/or the number of replacement periods selected among all replacement periods. The second-fourth area 840 may include at least one of an application object for applying the replacement task through the verification of the replacement task and/or a cancellation object for canceling the application of the replacement task. In an embodiment, a location of the second-fourth area 840 may be below the second-second area 820 on the second screen 800 output by the output unit of the computing device 100. However, the locations of the second-first area 810, the second-second area 820, the second-third area 830, and the second-fourth area 840 are not limited thereto.

Figure 9:
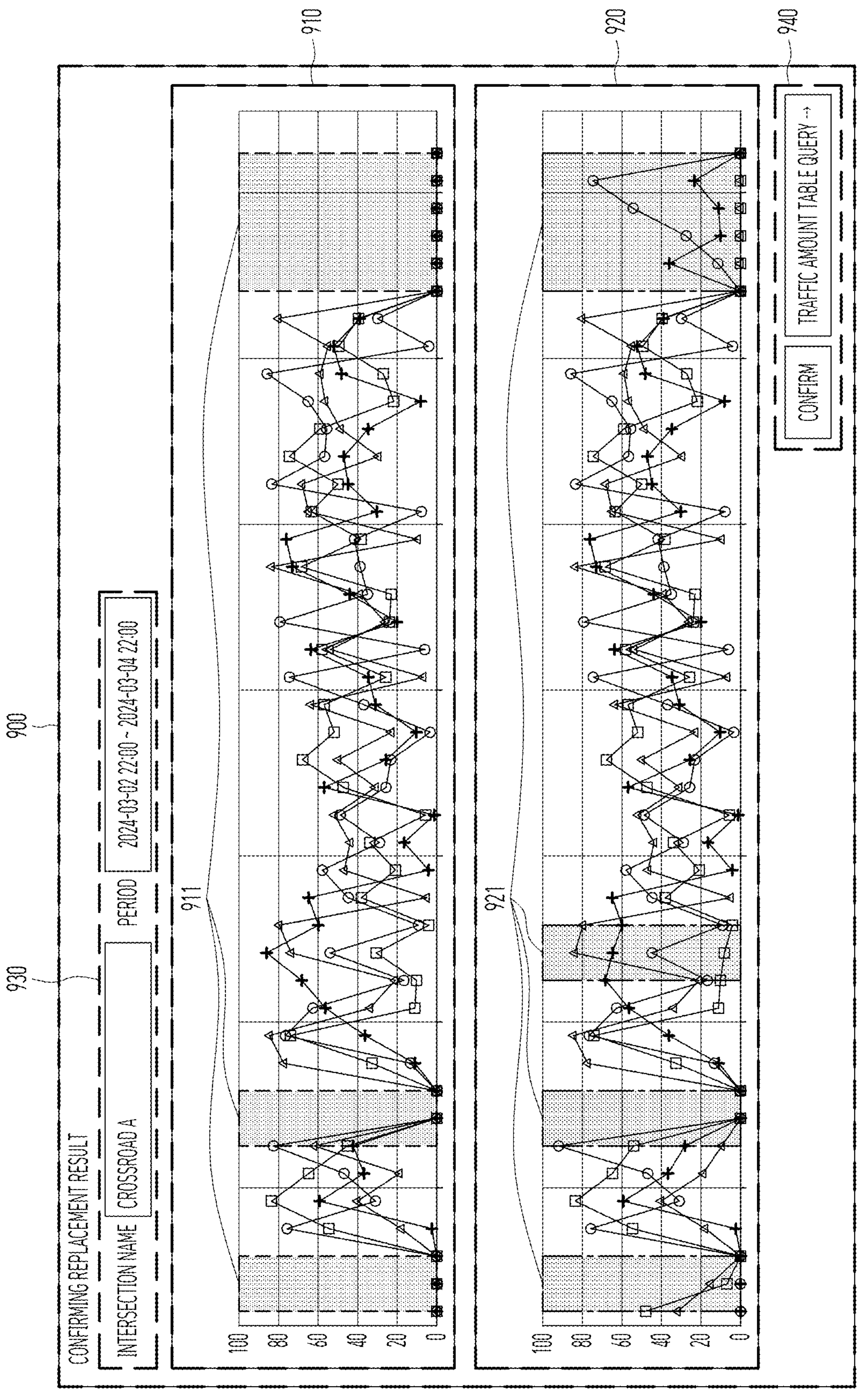
FIG. 9 is a diagram illustrating a third screen for displaying a replacement results in a first type of data structure according to an embodiment of the present disclosure.

FIG. 9 is a diagram illustrating a third screen for displaying a replacement results in a first type of data structure according to an embodiment of the present disclosure.

Referring to FIG. 9, the user interface may include a third screen 900 for displaying the replacement result according to the replacement task in a first type of data structure. A detailed description of a redundant component in FIG. 9 may be omitted, and may be replaced with contents described above with reference to FIGS. 1 to 8.

In an embodiment, the first type of data structure may mean a various types of structures visually representing data. For example, the first type of data structure may include chart data, an N-dimensional graph (N is a natural number of 2 or more), etc.

In an embodiment, the third screen 900 may include at least one area of a third-first area 910, a third-second area 920, a third-third area 930, and/or a third-fourth area 940.

In an embodiment, the third-first area 910 may display target traffic data before replacement in which a target inference result is not reflected to a target replacement period 911. In an embodiment, a chart of the target traffic data before replacement displayed in the target replacement period 911 may correspond to the chart of the target traffic data displayed in the first-first area 510 of FIG. 5. That is, the chart of the target traffic data before replacement displayed in the target replacement period 911 may be a chart to which an additional replacement period added by the user is not reflected.

In an embodiment, a location of the third-first area 910 may be an upper portion on the third screen 900 output by the output unit of the computing device 100.

In an embodiment, the third-second area 920 may display target traffic data after replacement in which the target inference result is reflected to a target replacement period 921. In an embodiment, a location of the third-second area 920 may be below the third-first area 910 on the third screen 900 output by the output unit of the computing device 100.

In an embodiment, the third-first area 910 and the third-second area 920 may be placed on the third screen 900 to be comparable with each other. For example, the third-first area 910 and the third-second area 920 display charts of target traffic data having sizes corresponding to each other, respectively, and align a location of a chart which is present in the third-first area 910 and a chart which is present in the third-second area 920, so the third-first area 910 and the third-second area 920 may be placed to be comparable with each other.

In an embodiment, the third-third area 930 may display at least one of identification information (e.g., a name of a site, etc.) for a selected site and/or information (e.g., a collection period of target traffic data, etc.) on target traffic data corresponding to the selected site. In an embodiment, a location of the third-third area 930 may be above the third-first area 910 on the third screen 900 output by the output unit of the computing device 100.

In an embodiment, the third-fourth area 940 may include at least one of a confirmation object for completing confirmation for the replacement result and/or a query object for confirming the replacement result as a data structure of a second type different from a first type. In an embodiment, a location of the third-fourth area 940 may be below the third-second area 920 on the third screen 900 output by the output unit of the computing device 100. However, the locations of the third-first area 910, the third-second area 920, the third-third area 930, and the third-fourth area 940 are not limited thereto.

FIG. 10 is a diagram illustrating a fourth screen for displaying the replacement results in a second type of data structure according to an embodiment of the present disclosure.

Referring to FIG. 10, the user interface may include a fourth screen 1000 for displaying the replacement result according to the replacement task in a second type of data structure. A specific description of a redundant component in FIG. 10 may be omitted, and may be replaced with contents described above with reference to FIGS. 1 to 9.

In an embodiment, the second type of data structure may mean a structure which inputs data into a predetermined specification. For example, the second type of data structure may include a table which is a structure in which data is placed in a row and a column.

In an embodiment, the fourth screen 1000 may include at least one area of a fourth-first area 1010, a fourth-second area 1020, a fourth-third area 1030, and/or a fourth-fourth area 1040.

In an embodiment, the fourth-first area 1010 may display at least one of traffic amount information of the first site, traffic amount information for each vehicle movement direction of the first site, vehicle occupancy information within the first site, and/or vehicle waiting line information included in the replacement result. For example, the fourth-first area 1010 may display at least one of traffic amount information of the first site, traffic amount information for each vehicle movement direction of the first site, vehicle occupancy information within the first site, and/or vehicle waiting line information included in the replacement result for each date and for each access road in a table constituted by rows and columns.

In an embodiment, the fourth-first area 1010 may display respective cells differently according to whether replacement is made. For example, the fourth-first area 1010 may display a cell corresponding to an item in which data is replaced with a first color in the target replacement period. The fourth-first area 1010 may display a cell corresponding to an item in which data is not replaced with a second color in the target replacement period. The fourth-first area 1010 may display a cell corresponding to an item other than the target replacement period with a third color. In an embodiment, a location of the fourth-first area 1010 may be an intermediate portion on the fourth screen 1000 output by the output unit of the computing device 100.

In an embodiment, the fourth-second area 1020 may display an input object for providing the replacement result as a file. In the present disclosure, the file as a logic unit for storing and managing data in a computer may be a digital document including a specific format of data. For example, the file may include an image file, a text file, etc. In an embodiment, a location of the fourth-second area 1020 may be a top right portion of the fourth-first area 1010 on the fourth screen 1000 output by the output unit of the computing device 100.

In an embodiment, the fourth-third area 1030 may display at least one of identification information (e.g., a name of a site, etc.) for a selected site, a data aggregation cycle at the selected site, and/or information (e.g., a collection period of target traffic data, etc.) on target traffic data corresponding to the selected site. In an embodiment, a location of the fourth-third area 1030 may be a top left portion of the fourth-first area 1010 on the fourth screen 1000 output by the output unit of the computing device 100.

In an embodiment, the fourth-fourth area 1040 may display a description for a display of each cell. For example, the fourth-fourth area 1040 may display descriptions of a display of a cell in which data is displayed before correction (before replacement), a display of a cell in which data is displayed after correction (after replacement), and a display of a cell in which data other than a correction target (replacement target) is displayed for each item. In an embodiment, a location of the fourth-third area 1030 may be above the fourth-second area 1020 on the fourth screen 1000 output by the output unit of the computing device 100. However, the locations of the fourth-first area 1010, the fourth-second area 1020, the fourth-third area 1030, and the fourth-fourth area 1040 are not limited thereto.

Figure 11:
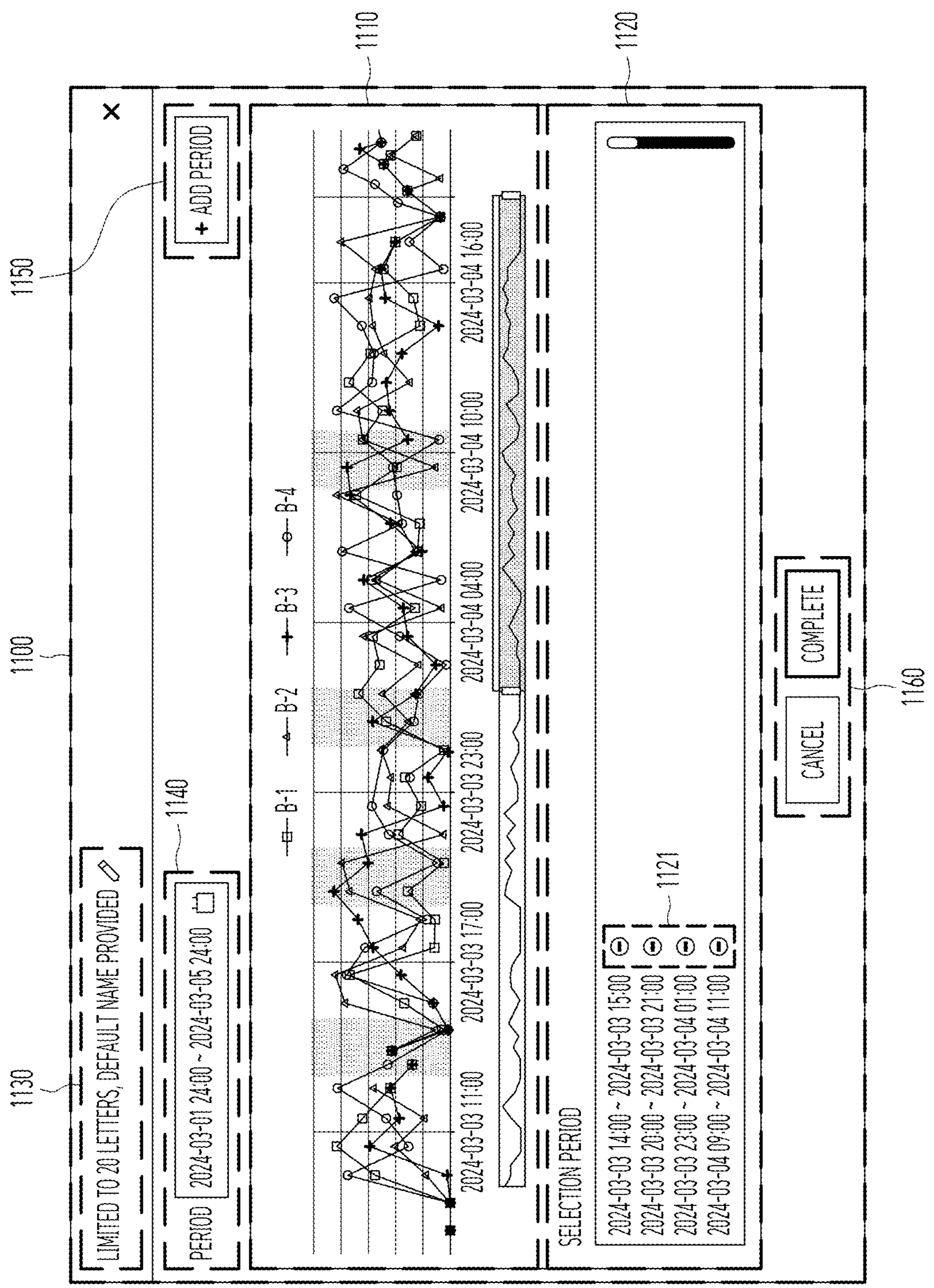
FIG. 11 is a diagram illustrating a fifth screen for registering a training dataset of an artificial intelligence model according to an embodiment of the present disclosure.

FIG. 11 is a diagram illustrating a fifth screen for registering a training dataset of an artificial intelligence model according to an embodiment of the present disclosure.

Referring to FIG. 11, the user interface may include a fifth screen 1100 for registering the training dataset of the artificial intelligence model. A detailed description of a redundant component in FIG. 11 may be omitted, and may be replaced with contents described above with reference to FIGS. 1 to 10.

In an embodiment, the first screen 1100 may include at least one area of a fifth-first area 1110, a fifth-second area 1120, a fifth-third area 1130, a fifth-fourth area 1140, a fifth-fifth area 1150, and/or a fifth-sixth area 1160.

In an embodiment, the fifth-first area 1110 may display a chart representing the traffic amount over time of the first traffic raw data corresponding to the first site. In an embodiment, the fifth-first area 1110 may allow a period selection of the user on the chart representing the traffic amount over time of the first traffic raw data corresponding to the first site. In an embodiment, the fifth-first area 1110 may visually display at least one selection period selected by the user on the chart. For example, at least one selection period may be displayed with a shade. In an embodiment, a location of the fifth-first area 1110 may be an intermediate portion on the fifth screen 1100 output by the output unit of the computing device 100.

In an embodiment, the fifth-second area 1120 may display information on at least one selection period as a text. For example, the fifth-second area 1120 may display time information of at least one selection period as the text. In an embodiment, the fifth-second area 1120 may include a deletion object 1121 for deleting a corresponding selection period for each selection period. In an embodiment, in response to a fifth user input of selecting the deletion object 1121, a display for the selection period corresponding to the deletion object 1121 may be removed from the fifth-first area 1110. In an embodiment, in response to the fifth user input of selecting the deletion object 1121, information on the selection period corresponding to the deletion object 1121 may be removed from the fifth-second area 1120. In an embodiment, a location of the fifth-second area 1120 may be below the fifth-first area 1110 on the fifth screen 1100 output by the output unit of the computing device 100.

In an embodiment, the fifth-third area 1130 may display a text input field which allows the user to write a name of a training dataset to be generated. In an embodiment, a location of the fifth-third area 1130 may be an upper left portion on the fifth screen 1100 output by the output unit of the computing device 100.

In an embodiment the fifth-fourth area 1140 may display information (e.g., the collection period of the target traffic data, etc.) on the target traffic data corresponding to the selected site. In an embodiment, a location of the fifth-fourth area 1140 may be between the fifth-first area 1110 and the fifth-third area 1130 on the fifth screen 1100 output by the output unit of the computing device 100.

In an embodiment, the fifth-fifth area 1150 may display a period addition object for allowing the user to select a period on the chart of the fifth-first area 1110. In an embodiment, a location of the fifth-fifth area 1150 may be a top right portion of the fifth-first area 1100 on the fifth screen 1110 output by the output unit of the computing device 100.

In an embodiment, the fifth-sixth area 1160 may include at least one of a completion object for registering the training dataset and/or a cancellation object for canceling the generation of the training dataset. In an embodiment, the training dataset may be registered as data which belongs to at least one selection period in the first traffic raw data. In an embodiment, the computing device 100 may train the artificial intelligence model with the registered training dataset. The artificial intelligence model trained with the registered training dataset may be added to the first set of artificial intelligence models mapped to the first site.

However, the locations of the fifth-first area 1110, the fifth-second area 1120, the fifth-third area 1130, the fifth-fourth area 1140, the fifth-fifth area 1150, and the fifth-sixth area 1160 are not limited thereto.

Figure 12:
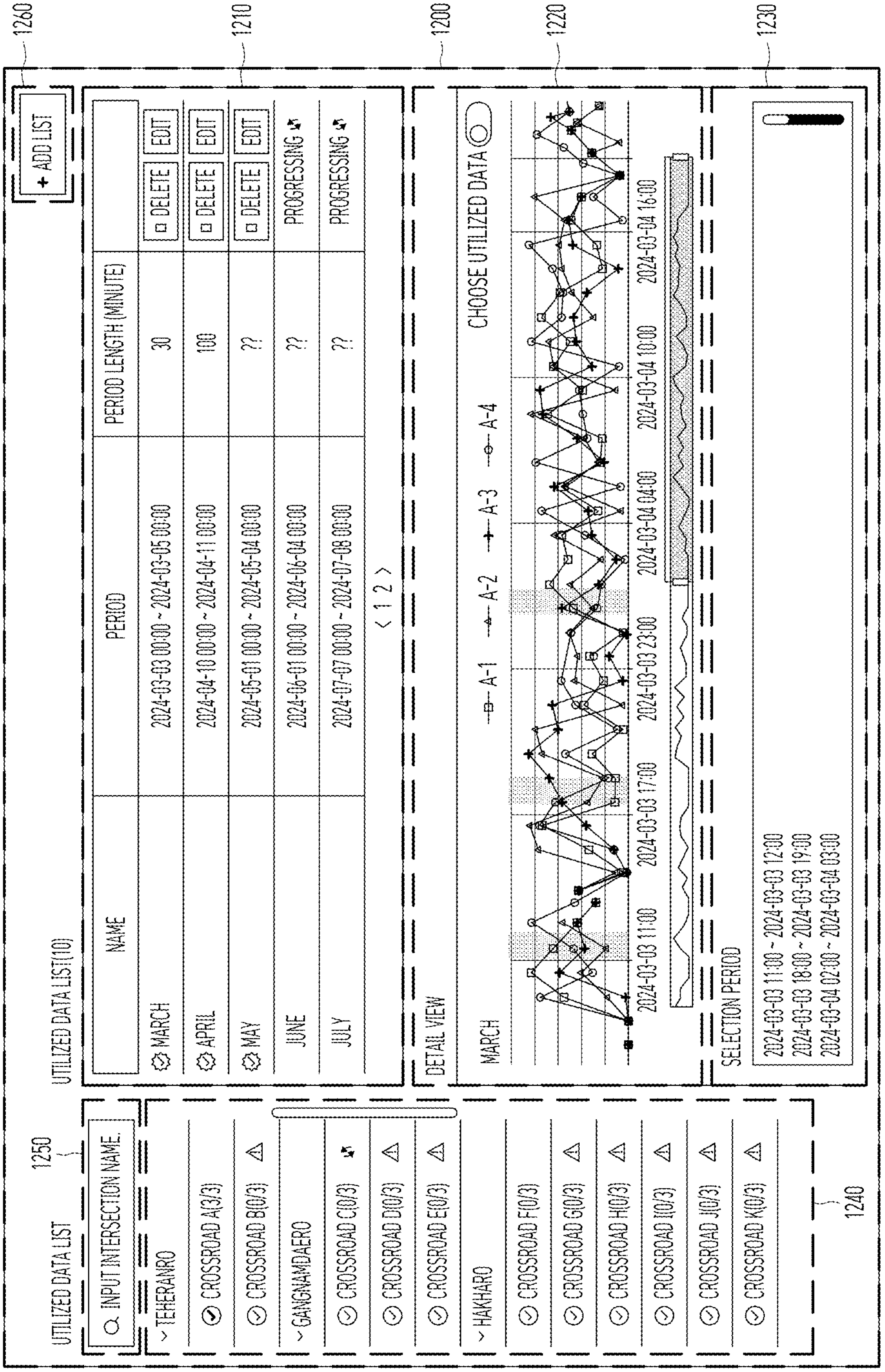
FIG. 12 is a diagram illustrating a sixth screen for selecting the training dataset of the artificial intelligence model according to an embodiment of the present disclosure.

FIG. 12 is a diagram illustrating a sixth screen for selecting the training dataset of the artificial intelligence model according to an embodiment of the present disclosure.

Referring to FIG. 12, the user interface may include a sixth screen 1200 for selecting the training dataset of the artificial intelligence model. A specific description of a redundant component in FIG. 12 may be omitted, and may be replaced with contents described above with reference to FIGS. 1 to 11.

In an embodiment, the sixth screen 1200 may include at least one area of a sixth-first area 1210, a sixth-second area 1220, a sixth-third area 1230, a sixth-fourth area 1240, a sixth-fifth area 1250, and/or a sixth-sixth area 1260.

In an embodiment, the sixth-first area 1210 may display a first training dataset list mapped to the first site. For example, the sixth-first area 1210 inputs each of first training datasets into the table to display the first training dataset list in the form of the table. In an embodiment, the sixth-first area 1210 may allow selection of a training dataset to be included in a first set of artificial intelligence models on the first training dataset list. In an embodiment, a location of the sixth-first area 1210 may be an upper portion on the sixth screen 1200 output by the output unit of the computing device 100.

In an embodiment, the sixth-second area 1220 may visually display a period corresponding to a training dataset selected on the first training dataset list on the chart representing the traffic amount over time of the first traffic raw data corresponding to the first site. For example, when a training dataset having a name of March is selected in the sixth-first area 1210, the sixth-second area 1220 may display at least one selection period included in the selected training dataset with the shade. In an embodiment, a location of the sixth-second area 1220 may be below the sixth-first area 1210 on the sixth screen 1200 output by the output unit of the computing device 100.

In an embodiment, the sixth-third area 1230 may display a period corresponding to the selected training dataset as the text. For example, the sixth-third area 1230 may display time information of at least one selection period included in the selected training dataset as the text. In an embodiment, a location of the sixth-third area 1230 may be below the sixth-second area 1220 on the sixth screen 1200 output by the output unit of the computing device 100.

In an embodiment, the sixth-fourth area 1240 may display a site list including site identification information indicating each of the plurality of sites including the first site. Whether each site included in the site list is currently selected may be differently displayed. For example, a current selected site and an unselected site may be displayed with different fonts, colors, etc. In an embodiment, a location of the sixth-fourth area 1240 may be a left portion of the sixth-first area 1210 on the sixth screen 1200 output by the output unit of the computing device 100.

In an embodiment, in response to a fourth user input of changing site identification information in a site list on the sixth-fourth area 1240, a list of changed training datasets corresponding to the changed site identification information may be displayed in the sixth-first area 1210. For example, when crossroad A is changed to crossroad B by the fourth user input, a list of training datasets corresponding to crossroad B may be displayed in the sixth-first area 1210. As data displayed in sixth-first area 1210 is changed, data displayed in the sixth-second area 1220 and/or the sixth-third area 1230 may be correspondingly changed.

In an embodiment, the site identification information may be constituted by a first indication for indicating a name or a location of a site and a second indication for indicating the number of artificial intelligence models mapped to the site. For example, in "crossroad A (3/3) on the sixth-fourth area 1240, "crossroad A" may be the first indication, and "3/3" may be the second indication indicating "the number of current mapped artificial intelligence models/the total number of mappable artificial intelligence models".

In an embodiment, the sixth-fifth area 1250 may display a search field which searches a desired site within a site list. In an embodiment, a location of the sixth-fifth area 1250 may be above the sixth-fourth area 1240 on the sixth screen 1200 output by the output unit of the computing device 100.

In an embodiment, the sixth-sixth area 1260 may display an addition object of the training dataset for adding the training dataset which is to be mapped to the first site. In an embodiment, in response to a sixth user input of selecting the addition object, a screen (e.g., the fifth screen 1100, etc.) for registering the training dataset of the artificial intelligence model may be output by the output unit of the computing device 100. In an embodiment, a location of the sixth-sixth area 1260 may be above the sixth-first area 1210 on the sixth screen 1200 output by the output unit of the computing device 100.

However, the locations of the sixth-first area 1210, the sixth-second area 1220, the sixth-third area 1230, the sixth-fourth area 1240, the sixth-fifth area 1250, and the sixth-sixth area 1260 are not limited thereto.

As described above with reference to FIGS. 1 to 12, the computing device 100 according to an embodiment of the present disclosure efficiently replaces the abnormal traffic data included in all traffic data to perform a meaningful analysis for all traffic data.

Further, the computing device 100 according to an embodiment of the present disclosure provides an interface for simply and efficiently replacing the abnormal traffic data is provided to a user to easily and conveniently replace the abnormal traffic data.

Figure 13:
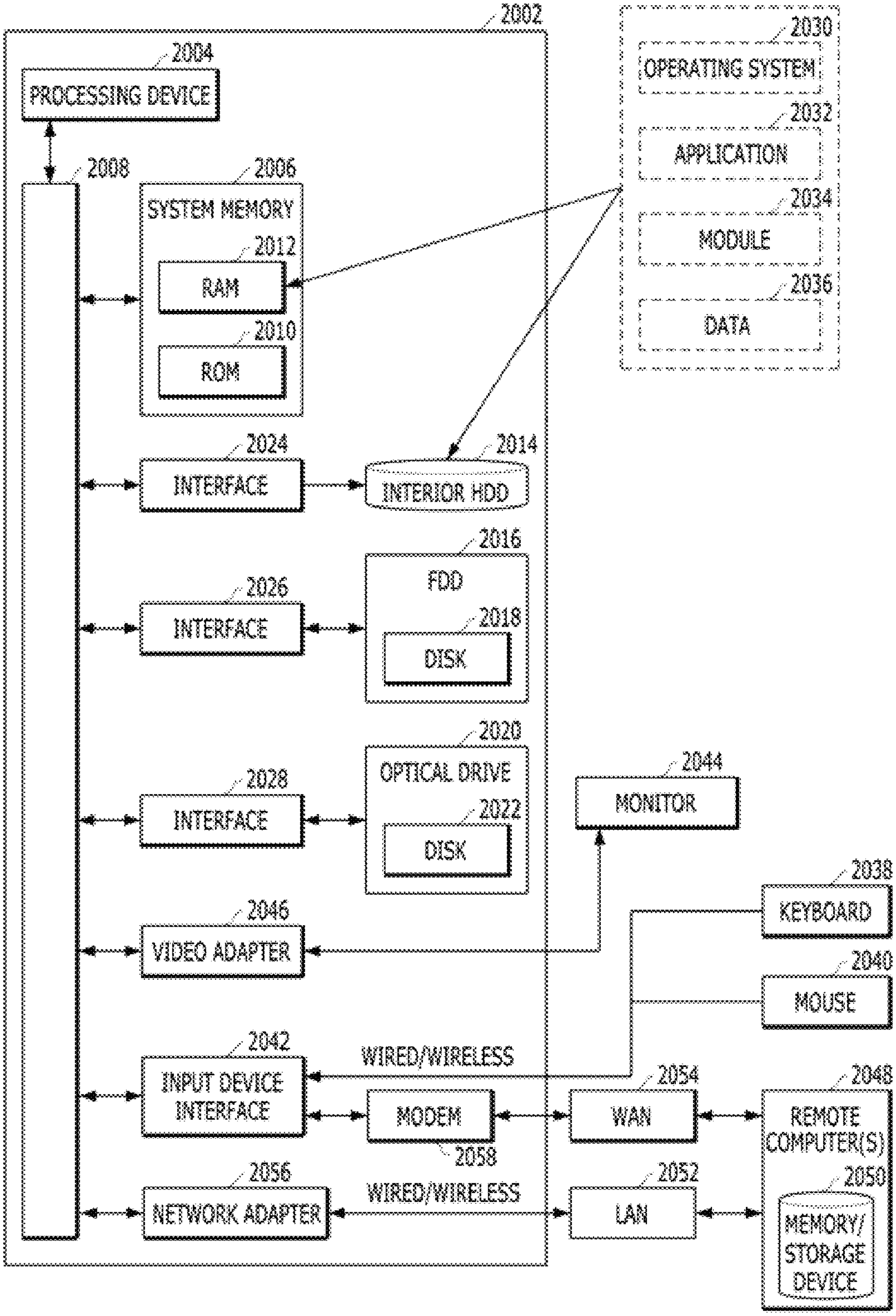
FIG. 13 illustrates a simple and general schematic view of an exemplary computing environment in which the embodiments of the present disclosure may be implemented.

FIG. 13 illustrates a brief and general schematic diagram of an exemplary computing environment in which embodiments of the present disclosure may be implemented.

Although the present disclosure has generally been described with respect to computer executable instructions that may be executed on one or more computers, those skilled in the art will appreciate that the present disclosure may be implemented in combination with other program modules and/or as a combination of hardware and software.

In general, modules herein include routines, procedures, programs, components, data structures, and the like that perform specific tasks or implement specific abstract data types. Those skilled in the art will also appreciate that the methods of the present disclosure may be implemented in single-processor or multiprocessor computer systems, minicomputers, mainframe computers, as well as personal computers, handheld computing devices, microprocessor-based or programmable home appliances, other computer system configurations, including others. (the respective devices may operate in connection with one or more associated devices).

The embodiments described in the present disclosure may also be implemented in a distributed computing environment in which certain tasks are performed by remote processing devices connected through a communication network. In the distributed computing environment, the program module may be located in both local and remote memory storage devices.

The computing device generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 2000 that implements various aspects of the present disclosure including a computer 2002 is shown and the computer 2002 includes a processing device 2004, a system memory 2006, and a system bus 2008. The system bus 2008 connects system components including the system memory 2006 (not limited thereto) to the processing device 2004. The processing device 2004 may be a predetermined processor among various commercial processors. A dual processor and other multi-processor architectures may also be used as the processing device 2004.

The system bus 2008 may be any one of several types of bus structures which may be additionally interconnected to a local bus using any one of a memory bus, a peripheral device bus, and various commercial bus architectures. The system memory 2006 includes a read only memory (ROM) 2010 and a random access memory (RAM) 2012. A basic input/output system (BIOS) is stored in the non-volatile memories 2010 including the ROM, the EPROM, the EEPROM, and the like and the BIOS includes a basic routine that assists in transmitting information among components in the computer 2002 at a time such as in-starting. The RAM 2012 may also include a high-speed RAM including a static RAM for caching data, and the like.

The computers 2002 also includes an internal hard disk drive (HDD) 2014 (e.g., EIDE, SATA)—that internal hard disk drives 2014 can also be configured for external use within an appropriate chassis (not shown)—, a magnetic floppy disk drives (FDD) 2016 (e.g., for reading from or writing in a mobile diskette 2018), and an optical disk drive 2020 (e.g., for reading a CD-ROM disk 2022, or reading from or writing in other high-capacity optical media such as the DVD). The hard disk drive 2014, the magnetic disk drive 2016, and the optical disk drive 2020 may be connected to the system bus 2008 by a hard disk drive interface 2024, a magnetic disk drive interface 2026, and an optical drive interface 2028, respectively. An interface 2024 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 2002, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 2030, one or more application programs 2032, other program module 2034, and program data 2036 may be stored in the drive and the RAM 2012. All or some of the operating system, the application, the module, and/or the data may also be cached in the RAM 2012. It will be well appreciated that the present disclosure may be implemented in operating systems which are commercially usable or a combination of the operating systems.

A user may input instructions and information in the computer 2002 through one or more wired/wireless input devices, for example, pointing devices such as a keyboard 2038 and a mouse 2040. Other input devices (not illustrated) may include a microphone, an IR remote controller, a joystick, a game pad, a stylus pen, a touch screen, and others. These and other input devices are often connected to the processing device 2004 through an input device interface 2042 connected to the system bus 2008, but may be connected by other interfaces including a parallel port, an IEEE 1394 serial port, a game port, a USB port, an IR interface, and others.

A monitor 2044 or other types of display devices are also connected to the system bus 2008 through interfaces such as a video adapter 2046, and the like. In addition to the monitor 2044, the computer generally includes a speaker, a printer, and other peripheral output devices (not illustrated).

The computer 2002 may operate in a networked environment by using a logical connection to one or more remote computers including remote computer(s) 2048 through wired and/or wireless communication. The remote computer (s) 2048 may be a workstation, a server computer, a router, a personal computer, a portable computer, a micro-processor based entertainment apparatus, a peer device, or other general network nodes and generally includes multiple components or all of the components described with respect to the computer 2002, but only a memory storage device 2050 is illustrated for brief description. The illustrated logical connection includes a wired/wireless connection to a local area network (LAN) 2052 and/or a larger network, for example, a wide area network (WAN) 2054. The LAN and WAN networking environments are general environments in offices and companies and facilitate an enterprise-wide computer network such as Intranet, and all of them may be connected to a worldwide computer network, for example, the Internet.

When the computer 2002 is used in the LAN networking environment, the computer 2002 is connected to a local network 2052 through a wired and/or wireless communication network interface or an adapter 2056. The adapter 2056 may facilitate the wired or wireless communication to the LAN 2052 and the LAN 2052 also includes a wireless access point installed therein in order to communicate with the wireless adapter 2056. When the computer 2002 is used in the WAN networking environment, the computer 2002 may include a modem 2058, is connected to a communication server on the WAN 2054, or has other means that configure communication through the WAN 2054 such as the Internet, etc. The modem 2058 which may be an internal or external and wired or wireless device is connected to the system bus 2008 through the serial port interface 2042. In the networked environment, the program modules described with respect to the computer 2002 or some thereof may be stored in the remote memory/storage device 2050. It will be well known that an illustrated network connection is exemplary and other means configuring a communication link among computers may be used.

The computer 2002 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

Wi-Fi (Wireless Fidelity) enables connections to the internet and other networks without the need for wires. Wi-Fi is a wireless technology that allows devices, such as computers, to send and receive data anywhere within the range of a base station, both indoors and outdoors, much like a cell phone within a coverage area. Wi-Fi networks use wireless technology, specifically IEEE 802.11 (a, b, g, and others), to provide secure, reliable, and high-speed wireless connections. Wi-Fi can be used to connect computers to each other, to the internet, and to wired networks (using IEEE 802.3 or Ethernet). Wi-Fi networks operate in unlicensed 2.4 and 5 GHz radio bands, for example, at data rates of 11 Mbps (802.11a) or 54 Mbps (802.11b), or can operate in dual-band products that cover both bands.

A person of ordinary skill in the art will understand that various exemplary logic blocks, modules, processors, means, circuits, and algorithm steps described in relation to the embodiments disclosed herein can be implemented in electronic hardware, in various forms of programming or design code (referred to here as 'software' for convenience), or in a combination of both. To clearly describe this hardware-software compatibility, various exemplary components, blocks, modules, circuits, and steps have been generally explained above in relation to their functions. Whether these functions are implemented as hardware or software will depend on design constraints imposed on the specific application and overall system. A person of ordinary skill in the art will be able to implement the functions described in various ways for each specific application; however, such implementation choices should not be construed as outside the scope of the present disclosure The various embodiments presented herein can be implemented as methods, devices, or articles of manufacture using standard programming and/or engineering techniques. The term 'article of manufacture' includes a computer program, carrier, or media that is accessible from any computer-readable device. For example, a computer-readable storage medium includes, but is not limited to, magnetic storage devices (e.g., hard disks, floppy disks, magnetic strips, etc.), optical disks (e.g., CDs, DVDs, etc.), smart cards, and flash memory devices (e.g., EEPROM, cards, sticks, key drives, etc.). The term 'machine-readable medium' includes, but is not limited to, wireless channels and various other media capable of storing, holding, and/or conveying instructions and/or data.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Method claims provide elements of various steps in a sample order, but the method claims are not limited to the presented specific order or hierarchical structure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing a user interface for replacing an abnormal traffic data in a computing device, comprising:

displaying on the user interface a target traffic data corresponding to a first site where a replacement task will be performed;

in response to receiving a first user input that determines a target replacement period to be replaced within the target traffic data, displaying, on the user interface, performance information of at least one of a first set of artificial intelligence models mapped to the first site, and at least one candidate inference result from a first set of candidate inference results generated by each of the first set of artificial intelligence models; and in response to receiving a second user input that selects a target inference result from the candidate inference results or a target artificial intelligence model from the first set of artificial intelligence models, displaying on the user interface a replacement result in which the abnormal traffic data is replaced with a target inference result of the target artificial intelligence model on the target traffic data; and wherein the user interface comprises a second screen for allowing a verification of the replacement task, the second screen comprising:

a second-first area displaying a chart indicating the target replacement period to be replaced within the target traffic data; and a second-second area displaying a list for the target replacement period and the performance information for each of multiple target replacement sub periods constituting the target replacement period; and wherein the second-second area:

displays a replacement result in which a first target replacement sub period among the multiple target replacement sub periods is replaced with a first candidate inference result corresponding to first performance information, and displays a replacement result in which a second target replacement sub period among the multiple target replacement sub periods is replaced with a second candidate inference result corresponding to second performance information, and wherein an artificial intelligence model corresponding to the first performance information and an artificial intelligence model corresponding to the second performance information belong to the first set of artificial intelligence models pre-stored to be mapped to the first site.

2. The method of claim 1, wherein the user interface includes a first screen for allowing a registration of the replacement task, and the first screen comprises:

a first-first area visually displaying the target traffic data;

a first-second area displaying a default replacement list that includes at least one replacement period belonging to the abnormal traffic data; and a first-third area displaying an additional replacement list that includes at least one additional replacement period added by a user on the target traffic data.

3. The method of claim 2, wherein the first screen further includes:

a first-fourth area displaying a location list comprising location identification information indicating each of multiple locations, including the first site.

4. The method of claim 1, wherein the target replacement period includes:

a first target replacement period determined within the abnormal traffic data automatically determined on the target traffic data; and a second target replacement period added by a user on the target traffic data.

5. The method of claim 1, further comprising:

after displaying the at least one performance information and the at least one candidate inference result on the user interface, in response to receiving a third user input that changes the performance information, changing an artificial intelligence model to be used for a replacement task for a third target replacement sub period corresponding to changed performance information among the multiple target replacement sub periods, and changing a replacement result corresponding to the third target replacement sub period indicated on the chart based on the candidate inference result of the changed artificial intelligence model, and displaying the changed replacement result.

6. The method of claim 1, wherein the user interface includes a third screen for displaying a replacement result according to the replacement task in a first type of data structure, and on the third screen:

a third-first area displaying the target traffic data before replacement, where the target inference result is not applied to the target replacement period, and a third-second area displaying the target traffic data after replacement, where the target inference result is applied to the target replacement period, are arranged to allow comparison between them.

7. The method of claim 1, wherein the user interface includes a fourth screen for displaying a replacement result according to the replacement task in a second type of data structure, and the fourth screen comprises:

a fourth-first area displaying at least one of the following included in the replacement result: a traffic volume information at the first site, a traffic volume information per vehicle movement direction at the first site, a vehicle occupancy information within the first site, and a vehicle queue information within the first site; and a fourth-second area displaying an input object for providing the replacement result as a file.

8. The method of claim 1, wherein the user interface includes a fifth screen for registering a training dataset of an artificial intelligence model, and the fifth screen comprises:

a fifth-first area allowing a user to select an interval on a chart indicating a traffic volume over time based on a first traffic raw data corresponding to the first site and visually indicating at least one selection interval selected by the user on the chart; and a fifth-second area displaying a list of the at least one selected interval as text, and wherein the training dataset is registered as data belonging to the at least one selection interval among a first traffic raw data.

9. The method of claim 8, wherein an artificial intelligence model trained with the registered training dataset is added to the first set of artificial intelligence models mapped to the first site.

10. The method of claim 1, wherein the at least one performance information includes a reliability of a corresponding artificial intelligence model or a reliability of a candidate inference result, and each of the candidate inference results includes a replacement data generated according to an inference result of a corresponding artificial intelligence model and information indicating a result of replacing the target replacement period with the replacement data.

11. The method of claim 1, wherein the target traffic data includes a chart indicating the abnormal traffic data on a first traffic raw data corresponding to the first site.

12. The method of claim 11, wherein the first traffic raw data includes traffic-related data processed from image data received via at least one camera installed at the first site, and wherein the traffic-related data includes at least one of traffic volume information of a site, traffic volume information per vehicle movement direction at a site, vehicle occupancy information within a site, and vehicle queue information within a site.

13. The method of claim 11, wherein the abnormal traffic data includes missing data corresponding to a time period in which traffic-related data less than a predetermined threshold is obtained from the first traffic raw data and is automatically determined independently of a user input.

14. A computer program stored in a non-transitory computer-readable medium, wherein the computer program causes a processor of a computing device to perform a method for providing a user interface for replacing abnormal traffic data, the method comprising:

displaying on the user interface a target traffic data corresponding to a first site where a replacement task will be performed;

in response to receiving a first user input that determines a target replacement period to be replaced within the target traffic data, displaying, on the user interface, performance information of at least one of a first set of artificial intelligence models mapped to the first site, and at least one candidate inference result from a first set of candidate inference results generated by each of the first set of artificial intelligence models; and in response to receiving a second user input that selects a target inference result from the candidate inference results or a target artificial intelligence model from the first set of artificial intelligence models, displaying on the user interface a replacement result in which the abnormal traffic data is replaced with a target inference result of the target artificial intelligence model on the target traffic data; and wherein the user interface comprises a second screen for allowing a verification of the replacement task, the second screen comprising:

a second-first area displaying a chart indicating the target replacement period to be replaced within the target traffic data; and a second-second area displaying a list for the target replacement period and the performance information for each of multiple target replacement sub periods constituting the target replacement period; and wherein the second-second area:

displays a replacement result in which a first target replacement sub period among the multiple target replacement sub periods is replaced with a first candidate inference result corresponding to first performance information, and displays a replacement result in which a second target replacement sub period among the multiple target replacement sub periods is replaced with a second candidate inference result corresponding to second performance information, and wherein an artificial intelligence model corresponding to the first performance information and an artificial intelligence model corresponding to the second performance information belong to the first set of artificial intelligence models pre-stored to be mapped to the first site.

15. A computing device for providing a user interface for replacing abnormal traffic data, comprising:

a processor;

a memory; and a network unit;

wherein the processor performs:

displaying on the user interface the target traffic data corresponding to a first site where a replacement task will be performed;

in response to receiving a first user input that determines a target replacement period to be replaced within the target traffic data, displaying, on the user interface, the performance information of at least one of the first set of artificial intelligence models mapped to the first site, and at least one candidate inference result from the first set of candidate inference results generated by each of the first set of artificial intelligence models; and in response to receiving a second user input that selects a target inference result from the candidate inference results or a target artificial intelligence model from the first set of artificial intelligence models, displaying on the user interface a replacement result in which the abnormal traffic data is replaced with the target inference result of the target artificial intelligence model on the target traffic data;

wherein the user interface comprises a second screen for allowing verification of the replacement task, the second screen comprising:

a second-first area displaying a chart indicating the target replacement period to be replaced within the target traffic data; and a second-second area displaying a list for the target replacement period and the performance information for each of multiple target replacement sub-periods constituting the target replacement period;

wherein the second-second area:

displays a replacement result in which a first target replacement sub-period among the multiple target replacement sub-periods is replaced with a first candidate inference result corresponding to first performance information, and displays a replacement result in which a second target replacement sub-period among the multiple target replacement sub-periods is replaced with a second candidate inference result corresponding to second performance information; and wherein an artificial intelligence model corresponding to the first performance information and an artificial intelligence model corresponding to the second performance information belong to the first set of artificial intelligence models pre-stored to be mapped to the first site.

* * * * *